United States Patent
Iguchi et al.

(10) Patent No.: US 11,025,028 B2
(45) Date of Patent: Jun. 1, 2021

(54) LIGHT GENERATING DEVICE, AND CARBON ISOTOPE ANALYZING DEVICE AND CARBON ISOTOPE ANALYZING METHOD EMPLOYING SAME

(71) Applicants: NATIONAL UNIVERSITY CORPORATION NAGOYA UNIVERSITY, Aichi (JP); SEKISUI MEDICAL CO., LTD., Tokyo (JP)

(72) Inventors: Tetsuo Iguchi, Aichi (JP); Hideki Tomita, Aichi (JP); Norihiko Nishizawa, Aichi (JP); Volker Sonnenschein, Aichi (JP); Ryohei Terabayashi, Aichi (JP); Atsushi Satou, Tokyo (JP)

(73) Assignees: NATIONAL UNIVERSITY CORPORATION NAGOYA UNIVERSITY, Aichi (JP); SEKISUI MEDICAL CO., LTD., Tokyo (JP)

( * ) Notice: Subject to any disclaimer, the term of this patent is extended or adjusted under 35 U.S.C. 154(b) by 0 days.

(21) Appl. No.: 16/640,921

(22) PCT Filed: Aug. 24, 2018

(86) PCT No.: PCT/JP2018/031317
§ 371 (c)(1),
(2) Date: Feb. 21, 2020

(87) PCT Pub. No.: WO2019/039584
PCT Pub. Date: Feb. 28, 2019

(65) Prior Publication Data
US 2020/0203916 A1    Jun. 25, 2020

(30) Foreign Application Priority Data
Aug. 24, 2017  (JP) .............................. JP2017-161461

(51) Int. Cl.
| | | |
|---|---|---|
| H01S 3/23 | (2006.01) | |
| H01S 3/067 | (2006.01) | |
| H01S 3/08 | (2006.01) | |
| H01S 3/10 | (2006.01) | |

(Continued)

(52) U.S. Cl.
CPC ....... H01S 3/2316 (2013.01); G01N 21/3504 (2013.01); G02F 1/3551 (2013.01);
(Continued)

(58) Field of Classification Search
CPC ............... H01S 3/2316; H01S 3/06716; H01S 3/06758; H01S 3/08013; H01S 3/10023;
(Continued)

(56) References Cited

U.S. PATENT DOCUMENTS 5,012,052 A * 4/1991 Hayes ................ G01N 30/7206
                                                            250/282
5,286,468 A * 2/1994 Chang .................... B01D 3/322
                                                            423/249

(Continued)

FOREIGN PATENT DOCUMENTS

| JP | 3390755 | 3/2003 |
| JP | WO2015122475 A1 * | 8/2015 |

(Continued)

OTHER PUBLICATIONS

Official Communication issued in International Patent Application No. PCT/JP2018/031317, dated Feb. 25, 2020.
(Continued)

Primary Examiner — Mark R Gaworecki
(74) Attorney, Agent, or Firm — Greenblum & Bernstein, P.L.C.

(57) ABSTRACT

Provided is a carbon isotope analysis device including a carbon dioxide isotope generator provided with a combustion unit that generates gas containing carbon dioxide isotope from carbon isotope, and a carbon dioxide isotope
(Continued)

purifying unit; a spectrometer including optical resonators having a pair of mirrors, and a photodetector that determines intensity of light transmitted from the optical resonators; and a light generator including a single light source, a first optical fiber that transmits first light from the light source, a second optical fiber that generates second light of a longer wavelength than the first light, the second optical fiber splitting from the first optical fiber and coupling therewith downstream, a first amplifier on the first optical fiber, a second amplifier on the second optical fiber, different in band from the first amplifier, and a nonlinear optical crystal.

20 Claims, 20 Drawing Sheets

(51) Int. Cl.
  *H01S 3/11* (2006.01)
  *H01S 3/16* (2006.01)
  *G01N 21/3504* (2014.01)
  *G02F 1/355* (2006.01)
  *G02F 1/365* (2006.01)

(52) U.S. Cl.
  CPC .......... *G02F 1/365* (2013.01); *H01S 3/06716* (2013.01); *H01S 3/06758* (2013.01); *H01S 3/08013* (2013.01); *H01S 3/10023* (2013.01); *H01S 3/11* (2013.01); *H01S 3/1608* (2013.01); *H01S 3/1616* (2013.01); *G01N 2201/0697* (2013.01); *G01N 2201/06113* (2013.01); *G02F 2203/11* (2013.01)

(58) Field of Classification Search
  CPC ........ H01S 3/11; H01S 3/1608; H01S 3/1616; H01S 3/005; H01S 3/0078; H01S 3/0092; H01S 3/2391; G01N 21/3504; G01N 2201/06113; G01N 2201/0697; G02F 1/365; G02F 2203/11; G02F 1/3551
  USPC ...................................................... 250/338.1
  See application file for complete search history.

(56) References Cited

U.S. PATENT DOCUMENTS

| | | | | | |
|---|---|---|---|---|---|
| 5,783,741 | A * | 7/1998 | Ellis | ................. | H01J 49/0422 250/288 |
| 5,818,580 | A * | 10/1998 | Murnick | ............. | G01N 21/171 356/311 |
| 5,864,398 | A * | 1/1999 | Murnick | ................. | G01N 21/62 356/311 |
| 5,929,442 | A * | 7/1999 | Higashi | ................. | G01N 21/39 250/339.13 |
| 6,486,474 | B1 * | 11/2002 | Owen | ................. | G01N 21/031 250/339.02 |
| 6,800,855 | B1 * | 10/2004 | Dong | ................. | G01N 21/39 250/339.13 |
| 6,940,083 | B2 * | 9/2005 | Mori | ................. | G01N 21/3504 250/573 |
| 7,101,340 | B1 * | 9/2006 | Braun | ................. | A61B 5/097 128/920 |
| RE40,184 | E * | 3/2008 | Lin | ................. | A61F 9/008 372/37 |
| 8,539,816 | B2 * | 9/2013 | Kachanov | ............. | G01N 21/39 73/24.02 |
| 9,541,497 | B2 * | 1/2017 | Heyne | ................. | A61B 5/082 |
| 2002/0134940 | A1 * | 9/2002 | Ohkubo | ............. | G01N 21/3504 250/339.13 |
| 2003/0146760 | A1 * | 8/2003 | Kogawa | ................. | G01T 1/178 324/464 |
| 2003/0178589 | A1 * | 9/2003 | Mori | ................. | G01N 33/004 250/573 |
| 2003/0228708 | A1 * | 12/2003 | Huber | ................. | G01N 1/34 436/181 |
| 2006/0013270 | A1 * | 1/2006 | Yumoto | ................. | G01N 21/39 372/21 |
| 2007/0018091 | A1 * | 1/2007 | Garner | ................. | H01J 49/0086 250/283 |
| 2007/0074541 | A1 * | 4/2007 | Badding | ................. | C03C 17/02 65/413 |
| 2007/0077167 | A1 * | 4/2007 | Mori | ................. | G01N 21/3504 422/54 |
| 2007/0242720 | A1 * | 10/2007 | Eckles | ................. | G01J 3/0297 372/107 |
| 2008/0129994 | A1 * | 6/2008 | Murnick | ............. | G01N 21/1717 356/318 |
| 2010/0002234 | A1 * | 1/2010 | Cormier | ................. | G01N 21/39 356/436 |
| 2011/0155272 | A1 * | 6/2011 | Conway | ............. | G01N 33/1846 137/896 |
| 2011/0242659 | A1 * | 10/2011 | Eckles | ................. | G01J 3/42 359/508 |
| 2011/0270113 | A1 * | 11/2011 | Heyne | ................. | A61B 5/082 600/531 |
| 2011/0292377 | A1 * | 12/2011 | Osenberg | ............. | G01D 5/268 356/73 |
| 2011/0302992 | A1 * | 12/2011 | Robbins | ............. | G01N 21/3504 73/23.3 |
| 2012/0133931 | A1 * | 5/2012 | Fermann | ................. | H01S 3/0092 356/300 |
| 2012/0188550 | A1 * | 7/2012 | Matsuda | ................. | G01N 21/39 356/437 |
| 2012/0241622 | A1 * | 9/2012 | Heyne | ................. | G01N 21/3504 250/339.13 |
| 2012/0287418 | A1 * | 11/2012 | Scherer | ................. | G01N 21/39 356/51 |
| 2012/0298868 | A1 * | 11/2012 | Massick | ............. | G01N 33/497 250/339.13 |
| 2013/0202006 | A1 * | 8/2013 | Rudolph | ............. | H01S 3/06741 372/55 |
| 2013/0228688 | A1 * | 9/2013 | Plusquellic | ............. | G01J 3/26 250/339.06 |
| 2013/0256939 | A1 * | 10/2013 | Devenney | ............. | C04B 28/10 264/115 |
| 2013/0267035 | A1 * | 10/2013 | Russo | ................. | G01N 21/33 436/171 |
| 2014/0114206 | A1 * | 4/2014 | Joseph | ................. | G01N 33/497 600/532 |
| 2014/0172323 | A1 * | 6/2014 | Marino | ................. | G06Q 50/00 702/24 |
| 2014/0264031 | A1 * | 9/2014 | Fermann | ................. | A61B 5/082 250/339.02 |
| 2014/0301938 | A1 * | 10/2014 | Jeong | ................. | C07C 45/78 423/461 |
| 2015/0355086 | A1 * | 12/2015 | Gagliardi | ............. | G01J 3/0218 356/326 |
| 2016/0054180 | A1 * | 2/2016 | Giusfredi | ............. | G01N 21/274 250/339.07 |
| 2016/0069797 | A1 * | 3/2016 | Chanda | ................. | G01N 21/31 356/437 |
| 2016/0084757 | A1 * | 3/2016 | Miron | ................. | G01J 3/42 356/437 |
| 2016/0349177 | A1 | 12/2016 | Iguchi et al. | | |
| 2017/0059740 | A1 * | 3/2017 | Perkins | ................. | G01N 11/00 |
| 2017/0074779 | A1 * | 3/2017 | Chanda | ................. | G01N 21/31 |
| 2017/0187161 | A1 | 6/2017 | Fermann et al. | | |

FOREIGN PATENT DOCUMENTS

JP         6004412        10/2016
WO      2015/122475        8/2015

OTHER PUBLICATIONS

Galli et al., "Phy. Rev. Lett., 107, 270802", 2011, pp. 270802-1-270802-4.
Lee et al., "Midinfrared frequency comb by difference frequency of erbium and thulium fiber lasers in orientation-patterned gallium

(56) References Cited

OTHER PUBLICATIONS phosphide", Optics Express, vol. 25, No. 15, Jul. 12, 2017, pp. 17411-17416.
Cruz et al., "Mid-infrared optical frequency combs based on difference frequency generation for molecular spectroscopy", Optics Express, vol. 23, No. 20, Oct. 2, 2015, pp. 26814-26824.
Churin et al., "Efficient Frequency Comb Generation in the 9-um Region Using Compact Fiber Sources", IEEE Photonics Technology Letters, vol. 26, No. 22, Aug. 22, 2014, pp. 2271-2274.
International Search Report issued in International Patent Application No. PCT/JP2018/031317, dated Nov. 20, 2018.
English Translation of Official Communication issued in International Patent Application No. PCT/JP2018/031317, dated Mar. 5, 2020.

* cited by examiner

51: OPTICAL RESONATOR
52: HIGHLY REFLECTIVE MIRROR
53: RING PIEZOELECTRIC ACTUATOR
54: WATER-COOLING HEATSINK
55: MIRROR DRIVING MECHANISM
56: GAS CELL FOR ANALYSIS
58: ADIABATIC CHAMBER
59: PELTIER ELEMENT

PMF OUTPUT
(Tm FIBER AMPLIFIER INPUT)

Tm FIBER AMPLIFIER OUTPUT

Er-DOPED FIBER-LASER-BASED MIR COMB GENERATION SYSTEM 2
(1.35 um + 1.85 um EXCITATION)

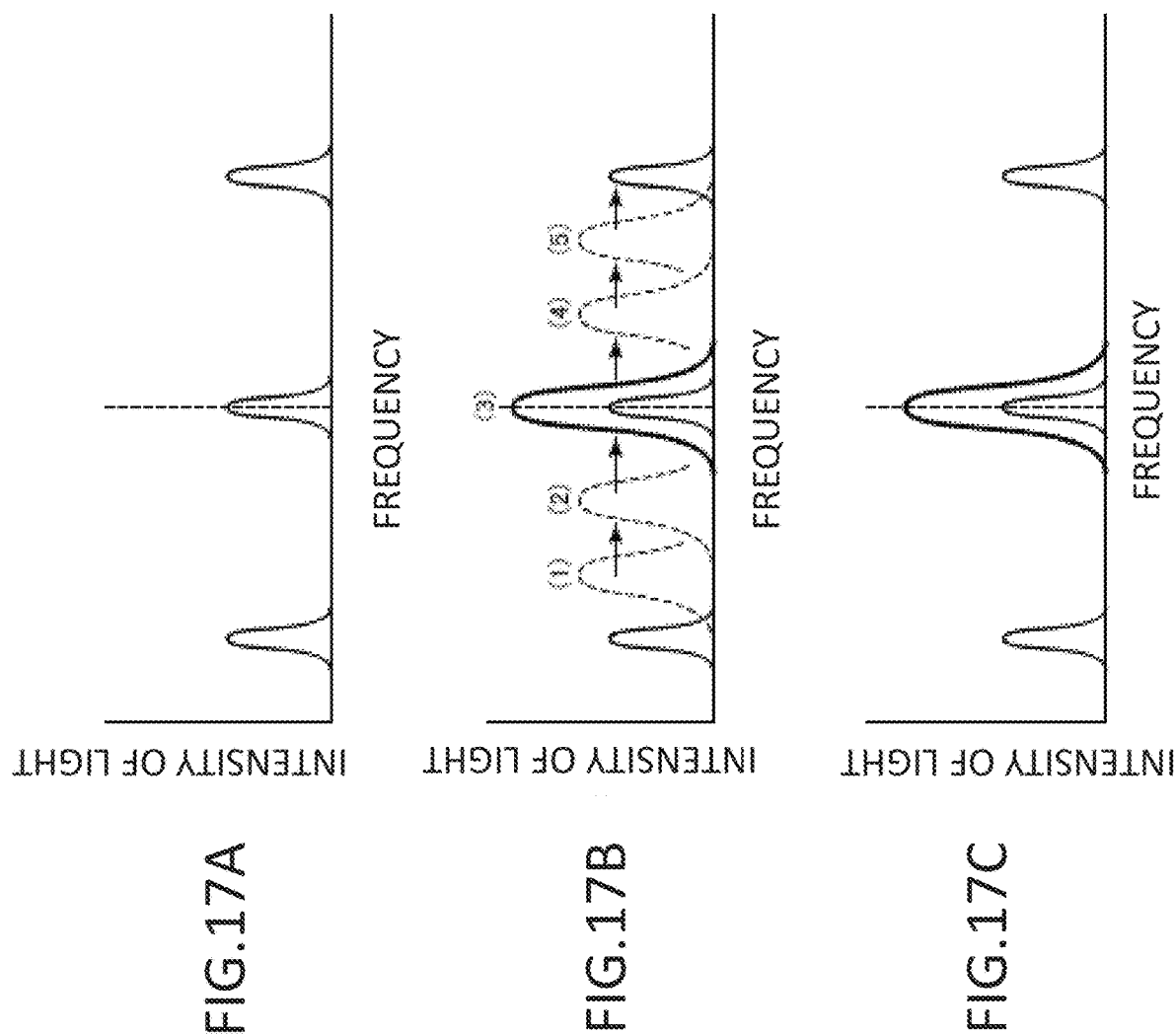

LIGHT GENERATING DEVICE, AND CARBON ISOTOPE ANALYZING DEVICE AND CARBON ISOTOPE ANALYZING METHOD EMPLOYING SAME

TECHNICAL FIELD

The present invention relates to a light generator that generates narrow-line-width and high-intensity light, and a carbon isotope analysis device and a carbon isotope analysis method, by use of the light generator. In particular, the present invention relates to a light generator useful for analysis of radioactive carbon isotope $^{14}C$ and the like, which generates narrow-line-width and high-intensity light, and a radioactive carbon isotope analysis device and a radioactive carbon isotope analysis method, by use of the light generator.

BACKGROUND ART

Carbon isotope analysis has been applied to a variety of fields, including assessment of environmental dynamics based on the carbon cycle, and historical and empirical research through radiocarbon dating. The natural abundances of carbon isotopes, which may vary with regional or environmental factors, are as follows: 98.89% for $^{12}C$ (stable isotope), 1.11% for $^{13}C$ (stable isotope), and $1\times10^{-10}$% for $^{14}C$ (radioisotope). These isotopes, which have different masses, exhibit the same chemical behavior. Thus, artificial enrichment of an isotope of low abundance and accurate analysis of the isotope can be applied to observation of a variety of reactions.

In the clinical field, in vivo administration and analysis of a compound labeled with, for example, radioactive carbon isotope $^{14}C$ are very useful for assessment of drug disposition. For example, such a labeled compound is used for practical analysis in Phase I or Phase IIa of the drug development process. Administration of a compound labeled with radioactive carbon isotope $^{14}C$ (hereinafter may be referred to simply as "$^{14}C$") to a human body at a very small dose (hereinafter may be referred to as "microdose") (i.e., less than the pharmacologically active dose of the compound) and analysis or the labeled compound are expected to significantly reduce the lead time for a drug discovery process because the analysis provides findings on drug efficacy and toxicity caused by drug disposition.

Examples of the traditional $^{14}C$ analysis include liquid scintillation counting (hereinafter may be referred to as "LSC") and accelerator mass spectrometry (hereinafter may be referred to as "AMS").

LSC involves the use of a relatively small table-top analyzer and thus enables convenient and rapid analysis. Unfortunately, LSC cannot be used in clinical trials because of its low $^{14}C$ detection sensitivity (10 dpm/mL). In contrast, AMS can be used in clinical trials because of its high $^{14}C$ detection sensitivity (0.001 dpm/mL), which is less than one thousandth of that of LSC. Unfortunately, the use of AMS is restricted because AMS requires a large and expensive analyzer. For example, since only around fifteens of AMS analyzers are provided in Japan, analysis of one sample requires about one week due to a long waiting time for samples to be analyzed. Thus, a demand has arisen for development of a convenient and rapid method of analyzing $^{14}C$.

Some techniques have been proposed for solving the above problems (see for example, Non-Patent Document 1 and Patent Document 1.).

I. Galli, et al, reported the analysis of $^{14}C$ of a natural isotope abundance level by cavity ring-down spectroscopy (hereinafter may be referred to as "CRDS") in Non-Patent Document 1, and this analysis has received attention.

Unfortunately, the $^{14}C$ analysis by CRDS involves the use of a 4.5-μm laser source having a very intricate structure. Thus, a demand has arisen for a simple and convenient apparatus or method for analyzing $^{14}C$.

Related Art

Patent Documents

Patent Document 1: Japanese Patent No. 3390755
Patent Document 2: Japanese Patent No. 6004412

Non-Patent Document

Non-Patent Document 1: I. Galli et al., Phy. Rev. Lett. 2011, 107, 270802

SUMMARY OF INVENTION

Technical Problem

The present inventors have made studies in order to solve the above problems, and as a result, have proposed a simple and convenient carbon isotope analysis device and analysis method by use of an optical comb as a light source (see Patent Document 2). Meanwhile, such carbon isotope analysis device and analysis method have caused an additional object for a further increase in analytical accuracy due to an increase in output of the light source (an increase in intensity of light).

An object of the present invention is to provide a simple and convenient light generator that can analyze $^{14}C$ and that generates narrow-line-width and high-output light, and carbon isotope analysis device and analysis method by use of the light generator.

Carbon isotope analysis device and analysis method by use of not any optical comb, but a general-purpose light source such as a quantum cascade laser (QCL), are demanded by some of those skilled in the art. Unfortunately, QCL varies in oscillation wavelength, and thus has a difficulty in performing accurate analysis of $^{14}C$ and the like. Therefore, highly reliable and also convenient carbon isotope analysis device and analysis method that can also analyze $^{14}C$ by use of a general-purpose light source such as QCL, other than an optical comb, are also demanded.

An object of the present invention is also to provide a highly reliable and also convenient light generator that can also analyze $^{14}C$, by use of QCL as a main light source, and carbon isotope analysis device and analysis method by use of the light generator.

Furthermore, there has also been the problem of the occurrence of a high noise on a baseline due to the parasitic etalon effect caused by reflection between surfaces of an optical resonator and an optical component on an optical path.

An object is also to reduce a noise on a baseline due to parasitic etalon.

Solution to Problem

The present invention relates to the following aspect:
<1> A carbon isotope analysis device including a carbon dioxide isotope generator provided with a combustion unit that generates gas containing carbon dioxide isotope from carbon isotope, and a carbon dioxide isotope purifying unit; a spectrometer including an optical resonator having a pair of mirrors, and a photodetector that determines intensity of light transmitted from the optical resonator; and a light generator including a single light source, a first optical fiber that transmits first light from the light source, a second optical fiber that generates second light of a longer wavelength than the first light, the second optical fiber splitting from a splitting node of the first optical fiber and coupling with the first optical fiber at a coupling node downstream, a first amplifier that is disposed between the splitting node and the coupling node of the first optical fiber, a second amplifier that is disposed between the splitting node and the coupling node of the second optical fiber and that is different in band from the first amplifier, and a nonlinear optical crystal that allows a plurality of light beams different in frequency to propagate through to thereby generate a mid-infrared optical frequency comb of a wavelength range from 4.5 μm to 4.8 μm, from the difference in frequency, as light at an absorption wavelength of the carbon dioxide isotope.

<2> The carbon isotope analysis device according to <1>, wherein the light source is a 1.55-μm ultrashort pulsed-laser light source, the first amplifier is an Er-doped optical fiber amplifier and the second amplifier a Tm-doped optical fiber amplifier, in the light generator.

<3> The carbon isotope analysis device according to <2>, wherein the first optical fiber further includes a third amplifier between the first amplifier and the coupling node, and a first wavelength-shifting fiber between the third amplifier and the coupling node, and the second optical fiber further includes a second wavelength-shifting fiber between the splitting node and the second amplifier.

<4> The carbon isotope analysis device according to <2>, wherein the first optical fiber further includes a third amplifier between the first amplifier and the coupling node, and the second optical fiber further includes a second wavelength-shifting fiber between the splitting node and the second amplifier, and a third wavelength-shifting fiber between the second amplifier and the coupling node.

<5> The carbon isotope analysis device according to <2>, wherein the first optical fiber further includes a third amplifier between the first amplifier and the coupling node, and the second optical fiber further includes a second wavelength-shifting fiber between the splitting node and the second amplifier.

<6> The carbon isotope analysis device according to any one of <1> to <5>, wherein the light generator applies light of a wavelength range of 1.3 μm to 1.7 μm through the first optical fiber and applies light of a wavelength range of 1.8 μm to 2.4 μm through the second optical fiber.

<7> The carbon isotope analysis device according to <4>, wherein light of a wavelength range of 1.8 μm to 2.0 μm is emitted through the second wavelength-shifting fiber, and light of a wavelength range of 2.3 μm to 2.4 μm is emitted through the third wavelength-shifting fiber.

<8> The carbon isotope analysis device according to <3>, wherein the first wavelength-shifting fiber is a dispersion shifted fiber (DSF).

<9> The carbon isotope analysis device according to <4>, wherein the second wavelength-shifting fiber is a small core fiber, and the third wavelength-shifting fiber is a highly nonlinear dispersion shifted fiber (HN-DSF).

<10> The carbon isotope analysis device according to any one of <1> to <9>, wherein a distance in a flow direction of light, of the nonlinear optical crystal, is longer than 11 mm.

<11> The carbon isotope analysis device according to any one of <1> to <10>, wherein the light generator further includes a delay line including a wavelength filter that separates the light from the light source to a plurality of spectral components, and a wavelength filter that adjusts the relative time delays of the plurality of spectral components and focuses the spectral components on the nonlinear crystal.

<12> The carbon isotope analysis device according to any one of <1> to <11>, wherein the nonlinear optical crystal is a PPMgSLT crystal or a PPLN crystal, or a GaSe crystal.

<13> The carbon isotope analysis device according to any one of <1> to <12>, wherein the spectrometer further includes a cooler that cools the optical resonator.

<14> The carbon isotope analysis device according to any one of <1> to <13>, wherein the spectrometer further includes a vacuum device that accommodates the optical resonator.

<15> A carbon isotope analysis method, including the steps of: generating carbon dioxide isotope from carbon isotope; feeding the carbon dioxide isotope into an optical resonator having a pair of mirrors; generating a plurality of light beams different in frequency, from a single light source, and amplifying intensities of the plurality of light beams obtained, by use of amplifiers different in band, respectively; allowing the plurality of light beams to propagate through a nonlinear optical crystal to thereby generate a mid-infrared optical frequency comb of a wavelength range from 4.5 μm to 4.8 μm, as irradiation light at an absorption wavelength of the carbon dioxide isotope, due to the difference in frequency; measuring the intensity of the transmitted light generated by resonance of carbon dioxide isotope excited by the irradiation light; and calculating the concentration of the carbon isotope from the intensity of the transmitted light.

<16> The carbon isotope analysis method according to <15>, wherein a light beam of a shorter wavelength is light of a wavelength range of 1.3 μm to 1.7 μm and a light beam of a longer wavelength is light of a wavelength range of 1.8 μm to 2.4 μm, among the light beams amplified.

<17> The carbon isotope analysis method according to <15> or <16>, wherein the irradiation light is applied to radioactive carbon dioxide isotope $^{14}CO_2$.

<18> A light generator including: a single light source; a first optical fiber that transmits light, from the light, source; a second optical fiber that transmits light of a longer wavelength than the first optical fiber, the second optical fiber splitting from a splitting node of the first optical fiber and coupling with the first optical fiber at a coupling node downstream; a first amplifier that is disposed between the splitting node and the coupling node of the first optical fiber; a second amplifier that is disposed between the splitting node and the coupling node of the second optical fiber and that is different in band from the first amplifier; and a nonlinear optical crystal through which a plurality of light beams different in frequency are allowed to propagate through to thereby generate a mid-infrared optical frequency comb of a wavelength range from 4.5 μm to 4.8 μm, as light at an absorption wavelength of the carbon dioxide isotope, due to the difference in frequency.

<19> The carbon isotope analysis device according to <18>, wherein the light source is a 1.55-μm ultrashort pulsed-laser light source, the first amplifier is an Er-doped optical fiber amplifier and the second amplifier is a Tm-doped optical fiber amplifier, in the light generator.

<20> The carbon isotope analysis device according to <18> or <19>, wherein the light generator applies light of a wavelength range of 1.3 μm to 1.7 μm through the first optical fiber and applies light of a wavelength range of 1.8 μm to 2.4 μm through the second optical fiber.

<21> The light generator according to any one of <18> to <20>, as an ultrashort pulsed-laser light source that generates a mid-infrared optical frequency comb of a wavelength range from 4.5 to 4.8 μm, wherein a second wavelength-shifting fiber is included in a rear stage of any of the amplifiers.

<22> A carbon isotope analysis device including a carbon dioxide isotope generator provided with a combustion unit that generates gas containing carbon dioxide isotope from carbon isotope, and a carbon dioxide isotope purifying unit; a spectrometer including an optical resonator having a pair of mirrors, and a photodetector that determines intensity of light transmitted from the optical resonator; and a light generator; wherein the light generator includes a light generator body having a main light source and an optical fiber that transmits light from the main light source; and a beat signal measurement system including an optical comb source that generates an optical comb made of a flux of narrow-line-width light beams where the wavelength region of a light beam is 4500 nm to 4800 nm, an optical fiber for beat signal measurement, the optical fiber transmitting light from the optical comb source, a splitter that is disposed on the optical fiber that transmits light from the main light source, an optical fiber that allows light from the main light source to be partially split and transmitted to the optical fiber for beat signal measurement via the splitter, and a photodetector that measures a beat signal generated due to the difference in frequency between light from the main light source and light from the optical comb source.

<23> A light generator including a light generator body having a main light source and an optical fiber that transmits light from the main light source; and a beat signal measurement system including an optical comb source that generates an optical comb made of a flux of narrow-line-width light beams where the wavelength region of a light beam is 4500 nm to 4800 nm, an optical fiber for beat signal measurement, the optical fiber transmitting light from the optical comb source, a splitter that is disposed on the optical fiber that transmits light from the main light source, an optical fiber that allows light from the main light source to be partially split and transmitted to the optical fiber for beat signal measurement via the splitter, and a photodetector that measures a beat signal generated due to the difference in frequency between light from the main light source and light from the optical comb source.

<24> A carbon isotope analysis method, including the steps of: generating an optical comb made of a flux of light beams where the frequency region of a light beam exhibits a narrow line width; displaying a spectrum of a light beam in the optical comb, at the center of the absorption wavelength region of a test subject, in a light spectrum diagram of intensity-versus-frequency; and transmitting light from the optical comb to the optical fiber for beat signal measurement; and applying light from a light source to a test subject in an optical resonator to measure the amount of light absorption; allowing light from a light source to be partially split and transmitted to the optical fiber for beat signal measurement, to generate a beat signal based on the difference in frequency between light from a light source and light from an optical comb source; and recording the wavelength of light applied to the test subject, obtained by the beat signal, together with the amount of light absorption, and measuring an accurate amount of light absorption of the test subject based on such recording.

<25> A spectrometer including an optical resonator having a pair of mirrors, a photodetector that determines intensity of light transmitted from the optical resonator, and an interference cancellation unit that cancels interference by a parasitic etalon effect, the interference causing the change in relative distance between a surface of the optical resonator and a surface of an optical component on an optical path.

<26> The spectrometer according to <25>, wherein the spectrometer includes an interference cancellation unit on any one of an optical axis between the optical resonator and a light generator and an optical axis between the optical resonator and the photodetector.

<27> The spectrometer according to <26>, wherein the spectrometer includes a vacuum device that accommodates the optical resonator; and a swingable transmission window on any one of an optical axis between the vacuum device and the light generator and an optical axis between the vacuum device and the photodetector, as the interference cancellation unit.

<28> The spectrometer according to any one of <25> to <27>, wherein the spectrometer further includes a cooler that cools the optical resonator, as the interference cancellation unit.

<29> A carbon isotope analysis device including a carbon dioxide isotope generator provided with a combustion unit that generates gas containing carbon dioxide isotope from carbon isotope, and a carbon dioxide isotope purifying unit; the spectrometer according to any one of <25> to <28>; and a light generator.

<30> The carbon isotope analysis method according to any one of <15> to <17>, further including a step of disposing a transmission window on any one of an optical axis between the optical resonator and a light generator and an optical axis between the optical resonator and a photodetector, and swinging the transmission window.

<31> The carbon isotope analysis method according to any one of <15> to <17>, further including a step of cooling the optical resonator to −10 to −40° C. and then changing the temperature of the optical resonator in the range from 1 to 5° C.

Advantageous Effects of Invention

The present invention provides a light generator that generates narrow-line-width and high-output light, and a simple and convenient carbon isotope analysis device and analysis method that can analyze $^{14}C$.

The present invention also provides a highly reliable and also convenient light generator that can also analyze $^{14}C$, by use of an optical comb and QCL, for a light source, and carbon isotope analysis device and analysis method by use of the light generator.

Furthermore, a noise on a baseline, due to parasitic etalon, is decreased.

BRIEF DESCRIPTION OF DRAWINGS

FIGS. 17A, 17B and 17C each illustrate a schematic view of a second aspect of a carbon isotope analysis method.

FIG. 18A illustrates a case of no plate modulation (Conventional Example), and FIG. 18B illustrates a case of any plate modulation (Example).

FIG. 19A illustrates a case of no temperature control (Conventional Example), and FIG. 19B illustrates a case of any temperature control (Example).

DESCRIPTION OF EMBODIMENTS

Figure 1:
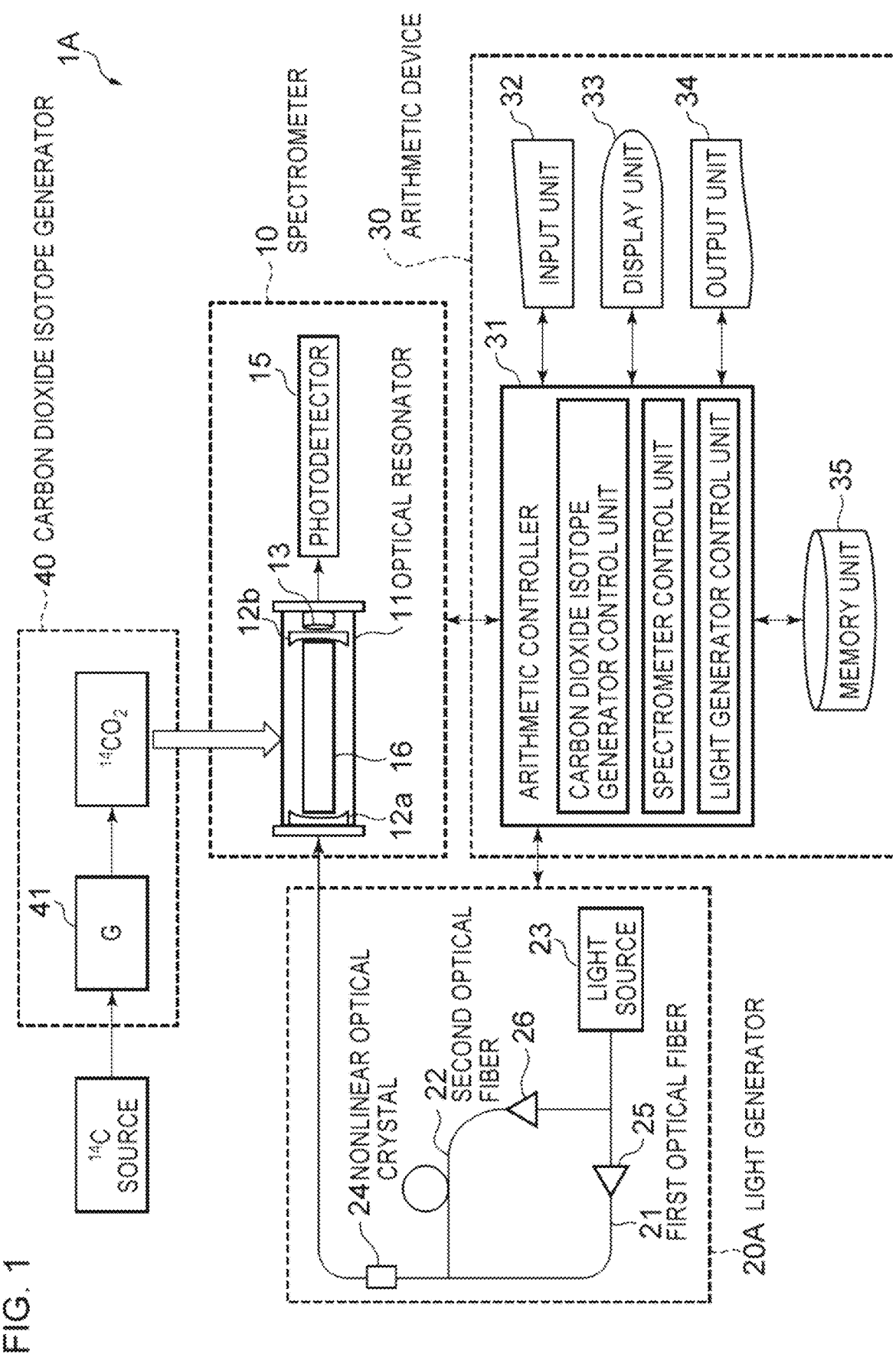
FIG. 1 is a conceptual view of a first embodiment of a carbon isotope analysis device.

The present invention will now be described by way of embodiments, which should not be construed to limit the present invention. In the drawings, the same or similar reference signs are assigned to components having the same or similar functions without redundant description. It should be noted that the drawings are schematic and thus the actual dimensions of each component should be determined is view of the following description. It should be understood that the relative dimensions and ratios between the drawings may be different from each other.

[First Aspect of Carbon Isotope Analysis Device]

FIG. 1 is a conceptual view of a carbon isotope analysis device. The carbon isotope analysis device 1 includes a carbon dioxide isotope generator 40, a light generator 20, a spectrometer 10, and an arithmetic device 30.

The carbon dioxide isotope generator 40 includes a combustion unit that generates gas containing carbon dioxide isotope from carbon isotope, and a carbon dioxide isotope purifying unit.

The spectrometer 10 includes an optical resonator having a pair of mirrors, and a photodetector that determines intensity of light transmitted from the optical resonator.

The light generator 20 includes a single light source, a first optical fiber that transmits light from the light source, a second optical fiber that transmits light of a longer wavelength than the first optical fiber, the second optical fiber splitting from a splitting node of the first optical fiber and coupling with the first optical fiber at a coupling node downstream, a first amplifier that is disposed between the splitting node and the coupling node of the first optical fiber, a second amplifier that is disposed between the splitting node and the coupling node of the second optical fiber and that is different in band from the first amplifier, and a nonlinear optical crystal through which a plurality of light beams different in frequency are allowed to propagate through to thereby generate light at an absorption wavelength of the carbon dioxide isotope, due to the difference in frequency.

In this embodiment, a radioisotope $^{14}C$, carbon isotope will be exemplified as an analytical sample. The light having an absorption wavelength range of the carbon dioxide isotope $^{14}CO_2$ generated from the radioisotope $^{14}C$ is light of a 4.5-μm wavelength range. The combined selectivity of the absorption line of the target substance, the light generator, and the optical resonator mode can achieve high sensitivity (detail is described later).

Throughout the specification, the term "carbon isotope" includes stable isotopes $^{12}C$ and $^{13}C$ and radioactive isotopes $^{14}C$, unless otherwise specified. In the case that the elemental signature "C" is designated, the signature indicates a carbon isotope mixture in natural abundance.

Stable isotopic oxygen includes $^{16}O$, $^{17}O$ and $^{18}O$ and the elemental signature "O" indicates an isotopic oxygen mixture in natural abundance.

The term "carbon dioxide isotope" includes $^{12}CO_2$, $^{13}CO_2$ and $^{14}CO_2$, unless otherwise specified. The signature "$CO_2$" includes carbon dioxide molecules composed of carbon isotope and isotopic oxygen each in natural abundance.

Throughout the specification, the term "biological sample" includes blood, plasma, serum, urine, feces, bile, saliva, and other body fluid and secretion; intake gas, oral gas, skin gas, and other biological gas; various organs, such as lung, heart, liver, kidney, brain, and skin, and crushed products thereof. Examples of the origin of the biological sample include all living objects, such as animals, plants, and microorganisms; preferably, mammals, preferably human beings. Examples of mammals include, but should not be limited to, human beings, monkey, mouse, rat, guinea pig, rabbit, sheep, goat, horse, cattle, pig, dog, and cat.

<Carbon Dioxide Isotope Generator>

The carbon dioxide isotope generator 40 may be of any type that can convert carbon isotope to carbon dioxide isotope. The carbon dioxide isotope generator 40 should preferably have a function to oxidize a sample and to convert carbon contained in the sample to carbon dioxide.

The carbon dioxide isotope generator 40 may be a carbon dioxide generator (G) 41, for example, a total organic carbon (TOC) gas generator, a sample gas generator for gas chromatography, a sample gas generator for combustion ion chromatography, or an elemental analyzer (EA).

Figure 2:
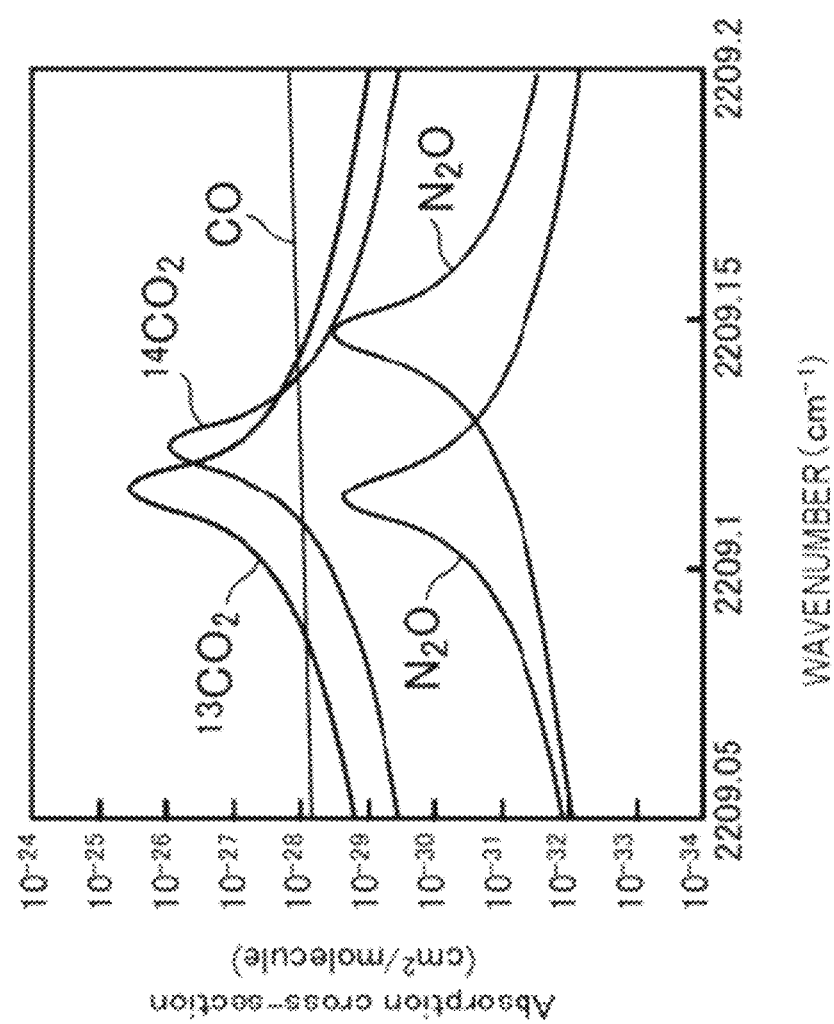
FIG. 2 illustrates absorption spectra in the 4.5-μm wavelength range of $^{14}CO_2$ and contaminant gases.

FIG. 2 is 4.5-μm wavelength range absorption spectra of $^{14}CO_2$ and competitive gases $^{13}CO_2$, CO, and $N_2O$ under the condition of a $CO_2$ partial pressure of 20%, a CO partial pressure of $1.0 \times 10^{-4}$% and a $N_2O$ partial pressure of $3.0 \times 10^{-8}$% at 273K.

Gas containing carbon dioxide isotope $^{14}CO_2$ (hereinafter merely "$^{14}CO_2$") can be generated through combustion of a pretreated biological sample; however, gaseous contaminants, such as CO and $N_2O$ are generated together with $^{14}CO_2$ in this process. CO and $N_2O$ each exhibit a 4.5-μm wavelength range absorption spectrum as illustrated in FIG. 2 and interfere with the 4.5-μm wavelength range absorption spectrum assigned to $^{14}CO_2$. Thus, Co and $N_2O$ should preferably be removed for improved analytical sensitivity.

A typical process of removing CO and $N_2O$ involves collection and separation of $^{14}CO_2$ as described below. The process may be combined with a process of removing or reducing CO and $N_2O$ with an oxidation catalyst or platinum catalyst.

(i) Collection and Separation of $^{14}CO_2$ by Thermal Desorption Column

The carbon dioxide isotope generator should preferably include a combustion unit and a carbon dioxide isotope purifying unit. The combustion unit should preferably include a combustion tube and a heater that enables the combustion tube to be heated. Preferably, the combustion tube is configured from refractory glass (such as quartz glass) so as to be able to accommodate a sample therein and is provided with a sample port formed on a part thereof. Besides the sample port, a carrier gas port through which carrier gas is introduced to the combustion tube may also be formed on the combustion tube. Herein, not only such an aspect where the sample port and the like are provided on a part of the combustion tube, but also a configuration where a sample introducing unit is formed as a separate component from the combustion tube at an end of the combustion tube and the sample port and the carrier gas port are formed on the sample introducing unit, may be adopted.

Examples of the heater include electric furnaces, specifically tubular electric furnaces that can place and heat a combustion tube therein. A typical example of the tubular electric furnace is ARF-30M (available from Asahi Rika Seisakusho).

The combustion tube should preferably be provided with an oxidation unit and/or a reduction unit packed with at least one catalyst, downstream of the carrier gas channel. The oxidation unit and/or the reduction unit may be provided at one end of the combustion tube or provided in the form of a separate component. Examples of the catalyst to be contained in the oxidation unit include copper oxide and a mixture of silver and cobalt oxide. The oxidation unit can be expected to oxidize $H_2$ and CO generated by combustion of a sample into $H_2O$ and $CO_2$. Examples of the catalyst to be contained in the reduction unit include reduced copper and a platinum catalyst. The reduction unit can be expected to reduce nitrogen oxide ($NO_x$) containing $N_2O$ into $N_2$.

The carbon dioxide isotope purifying unit may be a thermal desorption column ($CO_2$ collecting column) of $^{14}CO_2$ in a gas generated by combustion of a biological sample, for use in gas chromatography (GC). Thus, any influence of CO and/or $N_2O$ at the stage of detection of $^{14}CO_2$ can be reduced or removed. A $CO_2$ gas containing $^{14}CO_2$ is temporarily collected in a GC column and thus concentration of $^{14}CO_2$ is expected. Thus, it can be expected that the partial pressure of $^{14}CO_2$ increases.

(ii) Separation of $^{14}CO_2$ Through Trapping and Discharge of $^{14}CO_2$ with and from $^{14}CO_2$ Adsorbent The carbon dioxide isotope generator 40b should preferably include a combustion unit and a carbon dioxide isotope purifying unit. The combustion unit may have a similar configuration to that described above.

The carbon dioxide isotope purifying unit may be made of any $^{14}CO_2$ adsorbent, for example, soda lime or calcium hydroxide. Thus, $^{14}CO_2$ can be isolated in the form of carbonate to thereby allow the problem of gaseous contaminants to be solved. $^{14}CO_2$ can be retained as carbonate and thus a sample can be temporarily reserved. Herein, phosphoric acid can be used in the discharge.

Such gaseous contaminants can be removed by any of or both (i) and (ii).

(iii) Concentration (Separation) of $^{14}CO_2$ $^{14}CO_2$ generated by combustion of the biological sample is diffused in piping. Therefore, $^{14}CO_2$ may also be allowed to adsorb to an adsorbent and be concentrated, resulting in an enhancement in detection sensitivity (intensity). Such concentration can also be expected to separate $^{14}CO_2$ from CO and $N_2O$.

<Spectrometer>

With reference to FIG. 1, the spectrometer 10 includes an optical resonator 11 and a photodetector 15 that determines the intensity of the light transmitted from the optical resonator 11. The optical resonator or optical cavity 11 includes a cylindrical body to be filled with the target carbon dioxide isotope; a pair of highly reflective mirrors 12a and 12b respectively disposed at first and second longitudinal ends of the body such that the concave faces of the mirrors confront each other; a piezoelectric element 13 disposed at the second end of the body to adjust the distance between the mirrors 12a and 12b; and a cell 16 to be filled with an analyte gas. Although not illustrated, the side of the body is preferably provided with a gas inlet through which the carbon dioxide isotope is injected and a port for adjusting the pressure in the body. Herein, the pair of mirrors 12a and 12b preferably have a reflectance of 99% or more, more preferably 99.99% or more.

A laser beam incident on and confined in the optical resonator 11 repeatedly reflects between the mirrors over several thousand to ten thousand times while the optical resonator 11 emits light at an intensity corresponding to the reflectance of the mirrors. Thus, the effective optical path length of the laser beam reaches several tens of kilometers, and a trace amount of analyte gas contained in the optical resonator can yield large absorption intensity.

Figure 3A:
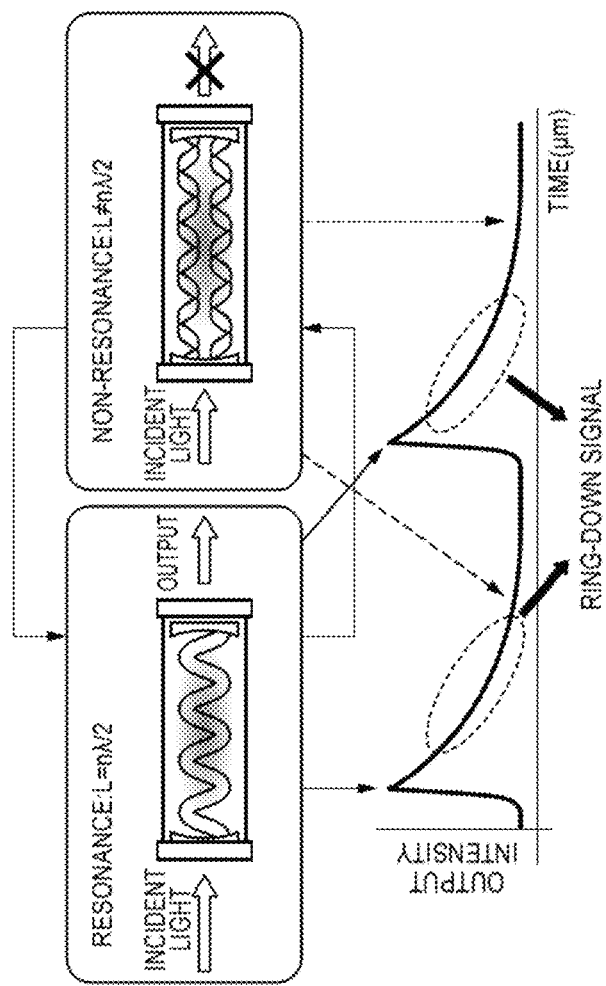
FIGS. 3A and 3B illustrate the principle of high-rate scanning cavity ring-down absorption spectroscopy using laser beam.
Figure 3B:
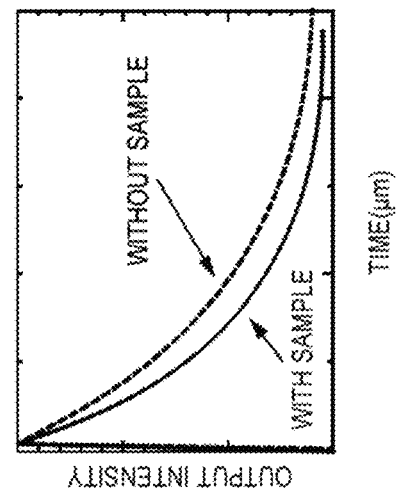

FIGS. 3A and 3B illustrate the principle of high-rate scanning cavity ring-down absorption spectroscopy (hereinafter may be referred to as "CRDS") using laser beam.

Figure 6:
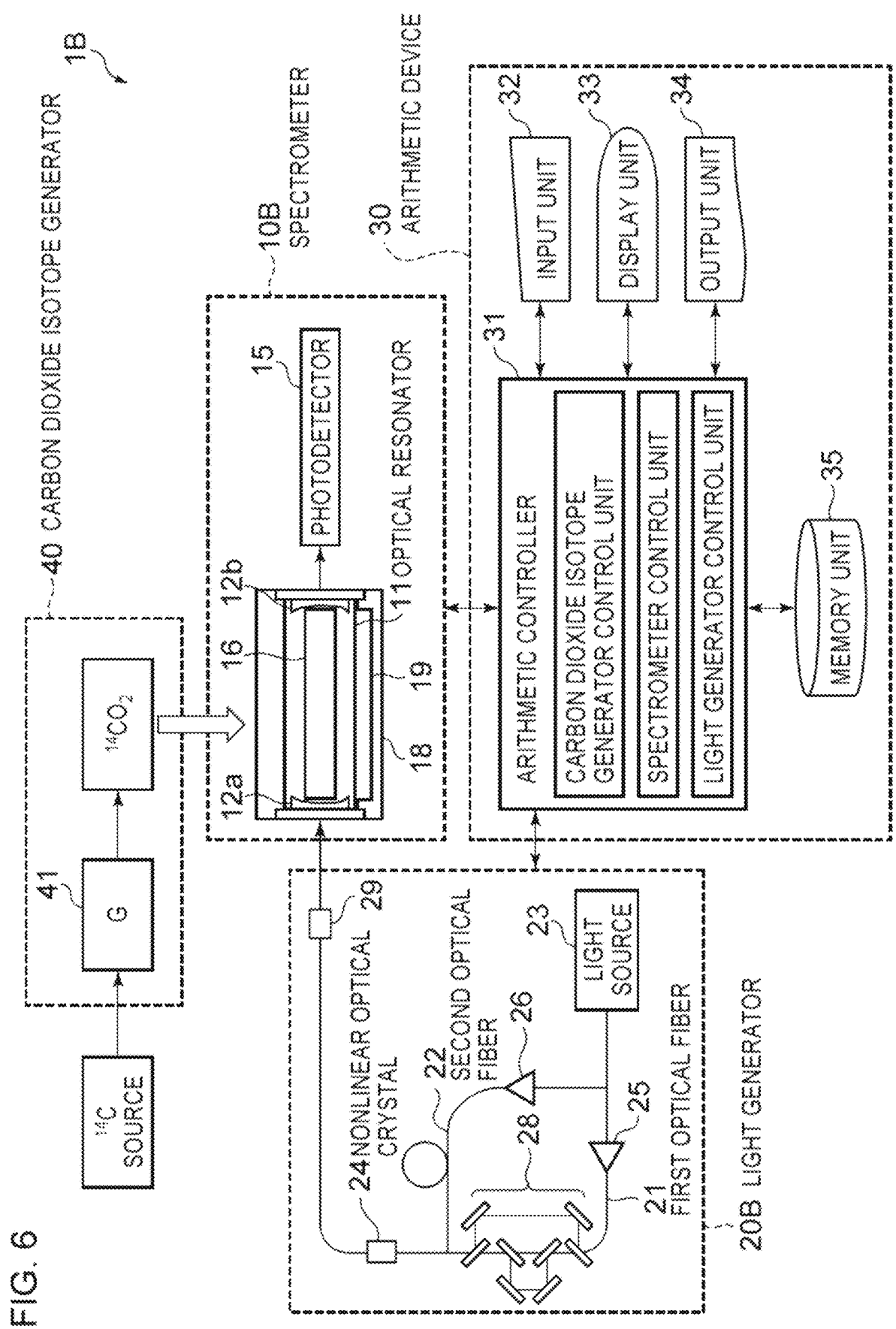
FIG. 6 is a conceptual view of a second embodiment of a carbon isotope analysis device.

As illustrated in FIG. 3A, the optical resonator in a resonance state between the mirrors outputs a high-intensity signal. In contrast, a non-resonance state between the mirrors, by the change through operation of the piezoelectric element 13, does not enable any signal to be detected due to the interference effect of light. In other words, an exponential decay signal (ring-down signal) as illustrated in FIG. 3A can be observed through a rapid change in the length of the optical resonator from a resonance state to a non-resonance state. Such a ring-down signal may be observed by rapid shielding of the incident laser beam with an optical switch 26 (FIG. 6).

In the case of the absence of a light-absorbing substance in the optical resonator, the dotted curve in FIG. 3B corresponds to a time-dependent ring-down signal output from the optical resonator. In contrast, the solid curve in FIG. 3B corresponds to the case of the presence of a light-absorbing substance in the optical resonator. In this case, the light decay time is shortened because of absorption of the laser beam by the light-absorbing substance during repeated reflection of the laser beam in the optical resonator. The light decay time depends on the concentration of the light-absorbing substance in the optical resonator and the wavelength of the incident laser beam. Thus, the absolute concentration of the light-absorbing substance can be calculated based on the Beer-Lambert law ii. The concentration of the light-absorbing substance in the optical resonator may be determined through measurement of a modulation in ring-down rate, which is proportional to the concentration of the light-absorbing substance.

While omitted and not illustrated in FIG. 3A, a transmission window (or a plate or window) may also be further provided on an optical axis of at least any one of irradiation light inlet and outlet ports located outside the optical resonator. A configuration may also be adopted where the temperature of the entire system of the optical resonator is controlled. Such a configuration can forcibly change the distance between a surface of the optical resonator and a surface of an optical component on an optical path to thereby eliminate baseline drifting, as described below.

The transmitted light leaked from the optical resonator is detected with the photodetector, and the concentration of $^{14}CO_2$ is calculated with the arithmetic device. The concentration of $^{14}C$ is then calculated from the concentration of $^{14}CO_2$.

The distance between the mirrors 12a and 12b in the optical resonator 11, the curvature radius of the mirrors 12a and 12b, and the longitudinal length and width of the body should preferably be varied depending on the absorption wavelength of the carbon dioxide isotope (i.e., analyte). The length of the resonator is adjusted from 1 mm to 10 m, for example.

In the case of carbon dioxide isotope $^{14}CO_2$, an increase in length of the resonator contributes to enhancement of the effective optical path length, but leads to an increase in volume of the gas cell, resulting in an increase in amount of a sample required for the analysis. Thus, the length of the resonator is preferably 10 cm to 60 cm. Preferably, the curvature radius of the mirrors 12a and 12b is equal to or slightly larger than the length of the resonator.

The distance between the mirrors can be adjusted by, for example, several micrometers to several tens of micrometers through the drive of the piezoelectric element 13. The distance between the mirrors can be finely adjusted by the piezoelectric element 13 for preparation of an optimal resonance state.

The mirrors 12a and 12b (i.e., a pair of concave mirrors) may be replaced with combination of a concave mirror and a planar mirror or combination of two planar mirrors that can provide a sufficient optical path.

The mirrors 12a and 12b may be composed of sapphire glass, Ca, $F_2$, or ZnSe.

The cell 16 to be filled with the analyte gas preferably has a small volume because even a small amount of the analyte effectively provides optical resonance. The volume of the cell 16 may be 8 ml to 1,000 mL. The cell volume can be appropriately determined depending on the amount of a $^{14}C$ source to be analyzed. For example, the cell volume is preferably 80 mL to 120 mL for a $^{14}C$ source that is available in a large volume (e.g., urine), and is preferably 8 mL to 12 mL for a $^{14}C$ source that is available only in a small volume (e.g., blood or tear fluid).

Evaluation of Stability Condition of Optical Resonator

The $^{14}CO_2$ absorption and the detection limit of CRDS were calculated based on spectroscopic data. Spectroscopic data on $^{12}CO_2$ and $^{13}CO_2$ were retrieved from the high-resolution transmission molecular absorption database (HITRAN), and spectroscopic data on $^{14}CO_2$ were extracted from the reference "S. Dobos, et al., Z. Naturforsch, 44a, 633-639 (1989)".

A Modification ($\Delta\beta$) in ring-down rate (exponential decay rate) caused by $^{14}CO_2$ absorption ($\Delta\beta=\beta-\beta_0$ where $\beta$ is a decay rate in the presence of a sample, and $\beta_0$ is a decay rate in the absence of a sample) is represented by the following expression:

$$\Delta\beta=\sigma_{14}(\lambda,T,P)N(T,P,X_{14})c$$

where $\sigma_{14}$ represents the photoabsorption cross section of $^{14}CO_2$, N represents the number density of molecules, c represents the speed of light, and $\sigma_{14}$ and N are the function of $\lambda$ (the wavelength of laser beam), T (temperature), P (pressure), and $X_{14}$=ratio $^{14}C/^{Total}C$.

Figure 4:
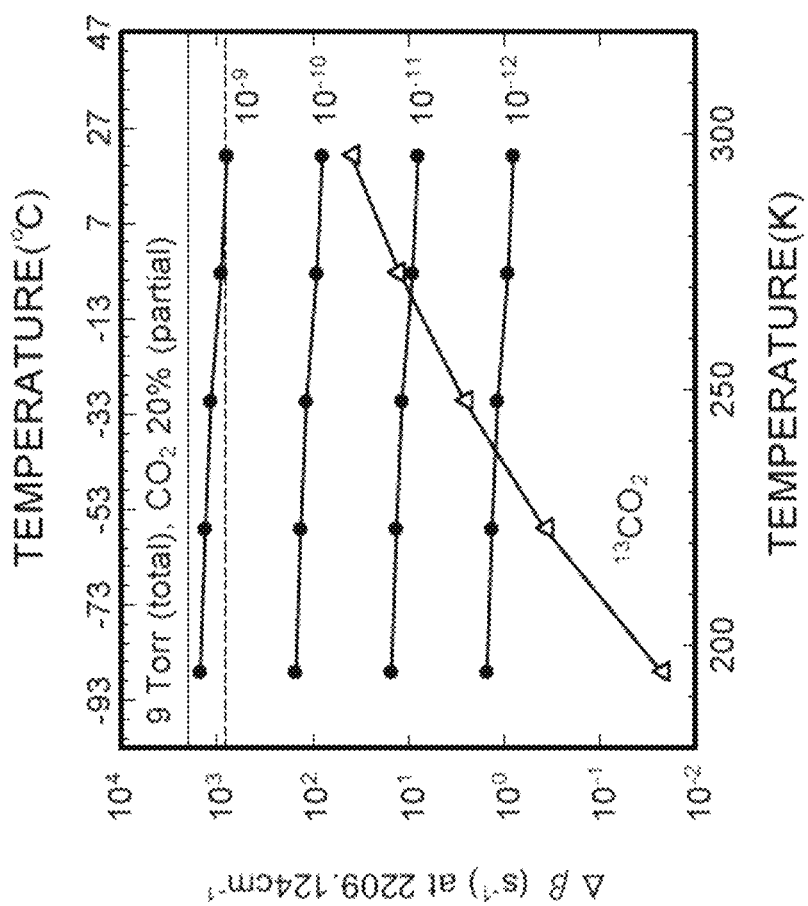
FIG. 4 illustrates the dependence of CRDS absorption Δβ of $^{13}CO_2$ and $^{14}CO_2$ on temperature.

FIG. 4 illustrates the temperature dependence of calculated $\Delta\beta$ due to $^{13}CO_2$ absorption or $^{14}CO_2$ absorption. As illustrated in FIG. 4, $^{13}CO_2$ absorption is equal to or higher than $^{14}CO_2$ absorption at 300K (room temperature) at a $^{14}C/^{Total}C$ of $10^{-10}$, $10^{-11}$, or $10^{-12}$, and thus the analysis requires cooling is such a case.

If a Modification ($\Delta\beta_0$) in ring-down rate (corresponding to noise derived from the optical resonator) can be reduced to a level on the order of $10^1 s^{-1}$, the analysis could be performed at a ratio $^{14}C/^{Total}C$ on the order of $10^{-11}$. Thus, cooling at about −40° C. is required during the analysis.

In the case of a ratio $^{14}C/^{Total}C$ of $10^{-11}$ as a lower detection limit, the drawing suggests that requirements involve an increase (for example, 20%) in partial pressure of $CO_2$ gas due to concentration of the $CO_2$ gas and the temperature condition described above.

The cooler and the cooling temperature will be described in more detail in the section of a second aspect of the carbon isotope analysis device, described below.

Figure 5:
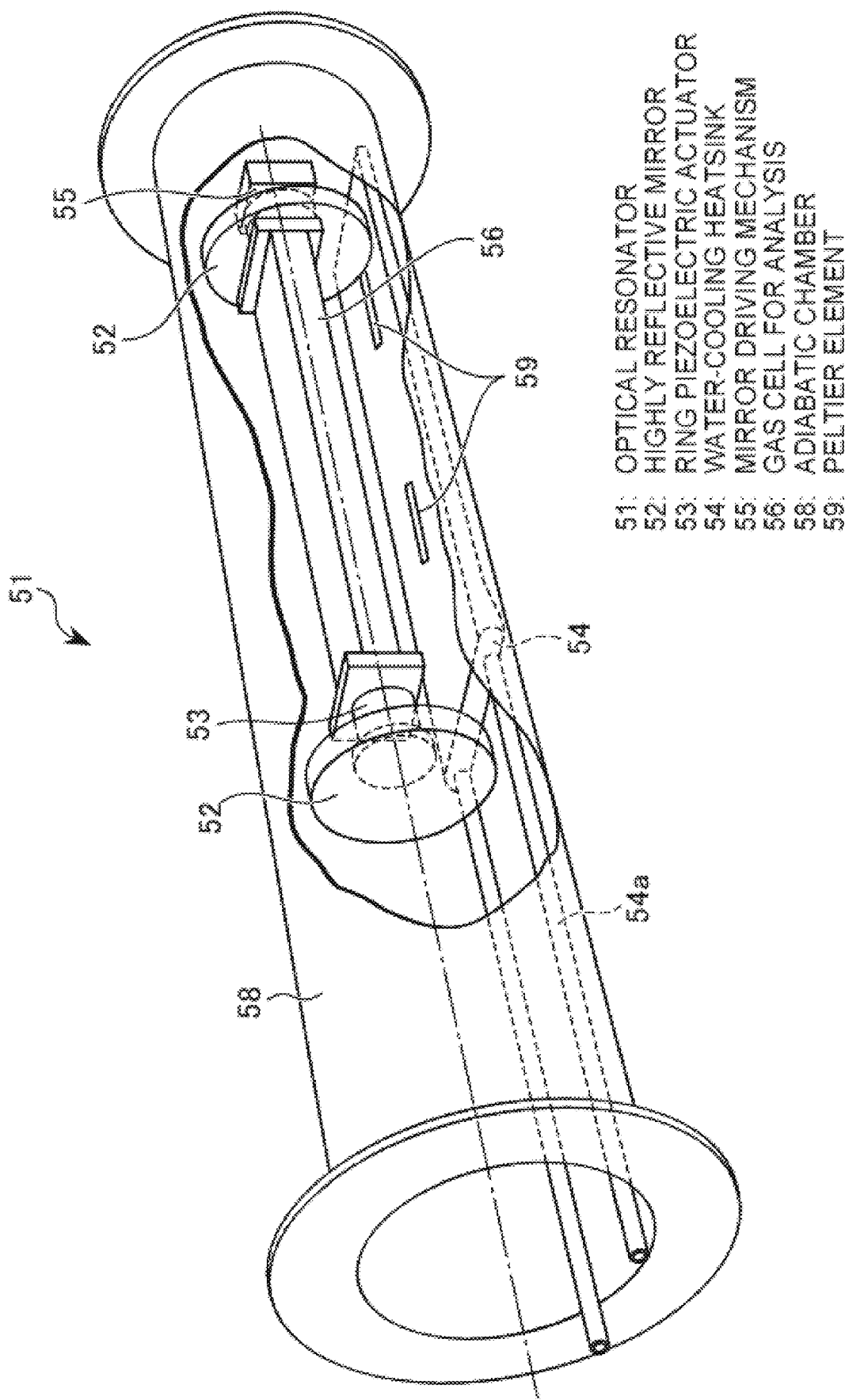
FIG. 5 is a conceptual view of a Modification of the optical resonator.

FIG. 5 illustrates a conceptual view (partially cross-sectional view) of a modification of the optical resonator 11 described. As illustrated in FIG. 5, an optical resonator 51 includes a cylindrical adiabatic chamber (vacuum device) 58, a gas cell 56 for analysis disposed in the adiabatic chamber 58, a pair of highly reflective mirrors 52 disposed at two ends of the gas cell 56, a mirror driving mechanism 55 disposed at one end of the gas cell 56, a ring piezoelectric actuator 53 disposed on the other end of the gas cell 56, a Peltier element 59 for cooling the gas cell 56, and a water-cooling heatsink 54 provided with a cooling pipe 54a connected to a circulation coiler (not illustrated).

<Light Generator>

The light generator 20 may be of any type that can generate light having the absorption wavelength of the carbon dioxide isotope. In this embodiment, a compact light generator will be described that can readily generate light of a 4.5-μm wavelength range, which is the absorption wavelength of radioactive carbon dioxide isotope $^{14}CO_2$.

The light source 23 is preferably an ultrashort pulse generator. In the case of use of an ultrashort pulse generator as the light source 23, a high photon density per pulse enables a nonlinear optical effect to be easily exerted, simply generating light of a 4.5-μm wavelength range corresponding to an absorption wavelength of radioactive carbon dioxide isotope flux of comb-like light beams uniform in width of each wavelength (optical frequency comb, hereinafter may be referred to as "optical comb") is obtained, and thus the variation in oscillation wavelength can be negligibly small. In the case of a continuous oscillation generator as the light source, the variation in oscillation wavelength causes a need for measurement of the variation in oscillation wavelength with an optical comb or the like.

The light source 23 can be, for example, a solid-state laser, a semiconductor laser or a fiber laser that generates short pulse by mode-locking. In particular, a fiber laser is preferably used because a fiber laser is a practical light source that is compact and also excellent in stability to environment.

Such a fiber laser can be an erbium. (Er)-based (1.55-μm wavelength range) or ytterbium (Yb)-based (1.04-μm wavelength range) fiber laser. An Er-based fiber laser is preferably used from the viewpoint of economics, and an Yb-based fiber laser is preferably used from the viewpoint of an enhancement in intensity of light.

A plurality of optical fibers 21 and 22 can be a first optical fiber 21 that transmits light from the light source and a second optical fiber 22 for wavelength conversion, the second optical fiber splitting from the first optical fiber 21 and coupling with the first optical fiber 21 downstream. The first optical fiber 21 can be any one connected from the light source to the optical resonator. A plurality of optical components and a plurality of optical fibers can be disposed on each path of the optical fibers.

It is preferred that the first optical fiber 21 can transmit high intensity of ultrashort light pulses without deterioration of the optical properties of the pulses. Specific examples can include a dispersion-compensating fiber (DCF) and a double-clad fiber. The first optical fiber 21 should preferably be composed of fused silica.

It is preferred that the second optical fiber 22 can efficiently generate ultrashort light pulses at a desired longer wavelength and transmit high intensity of ultrashort light pulses without deterioration of the optical properties of the pulses. Specific examples can include a polarization-maintaining fiber, a single-mode fiber, a photonic crystal fiber, and a photonic bandgap fiber. The optical fiber preferably has a length of several meters to several hundred meters depending on the amount of wavelength shift. The second optical fiber 22 should preferably be composed of fused silica.

The light generator should preferably further include, for example, a delay line 28 including a wavelength filter that separates light from the light source 23 to a plurality of spectral components and a wavelength filter that adjusts the relative time delays of the plurality of spectral components and focuses on a nonlinear crystal 24, as illustrated in FIG. 6.

The amplifier, for example, a first amplifier 21 disposed on the route of the first optical fiber 21 is preferably an Er-doped optical fiber amplifier, and a second amplifier 26 disposed on the route of the second optical fiber 22 is preferably a Tm-doped optical fiber amplifier.

The first optical fiber 21 should preferably further include a third amplifier, more preferably a third amplifier between the first amplifier 21 and the coupling node, because the intensity of light obtained is enhanced. The third amplifier should preferably be an Er-doped optical fiber amplifier.

The first optical fiber 21 should preferably further include a wavelength-shifting fiber, more preferably a wavelength-shifting fiber between the first amplifier and the coupling node, because the intensity of light obtained is enhanced.

The nonlinear optical crystal 24 is appropriately selected depending on the incident light and the emitted light. In the present Example, for example, a PPMgSLT (periodically poled MgO-doped Stoichiometric Lithium Tantalate ($LiTaO_3$)) crystal, a PPLN (periodically poled Lithium Niobate) crystal, or a GaSe (Gallium selenide) crystal can be used from the viewpoint that light of a about 4.5-μm wavelength range is generated from each incident light. Since a single fiber lases light source is used, perturbation of optical frequency can be cancelled out in difference frequency generation as described below.

The length in the irradiation direction (longitudinal direction) of the nonlinear optical crystal 24 is preferably longer than 11 mm, more preferably 32 mm to 44 mm, because a high-power optical comb is obtained.

Difference frequency generation (hereinafter may be referred to as "DFG") can be used to generate difference-frequency light. In detail, the light beams of different wavelengths (frequencies) from the first and second optical fibers 21 and 22 transmit through the non-linear optical crystal, to generate difference-frequency light based on the difference in frequency. In the present. Example, two light beams having wavelengths $\lambda_1$ and $\lambda_2$ are generated with the single light source 23 and propagate through the nonlinear optical crystal, to generate light in the absorption wavelength of carbon dioxide isotope based on the difference in frequency. The conversion efficiency of the DFG using the nonlinear optical crystal depends on the photon density of tight source having a plurality of wavelengths ($\lambda_1, \lambda_2, \ldots \lambda_x$). Thus, difference-frequency light can be generated from a single pulse laser light source through DFG.

The resultant 4.5-μm wavelength range light is an optical comb composed of a spectrum of frequencies (modes) with regular intervals ($f_r$) each corresponding to one pulse (frequency $f=f_{ceo}+N \cdot f_r$, N: mode number). CRDS using the optical comb requires extraction of light having the absorption wavelength of the analyte into an optical resonator including the analyte. Herein, $f_{ceo}$ is cancelled out and thus $f_{ceo}$ is 0 in the optical comb generated, according to a process of difference frequency generation.

In the case of the carbon isotope analysis device disclosed in. Non-Patent Document 1 by I. Galli, et al., laser beams having different wavelengths are generated from two laser devices (Nd: YAG laser and external-cavity diode laser (ECDL)), and light having the absorption wavelength of the carbon dioxide isotope is generated based on the difference in frequency between these laser beams. Both such beams correspond to continuous oscillation laser beams and thus are low in intensity of ECDL, and it is thus necessary for providing DFG sufficient in intensity to place a nonlinear optical crystal for use in DFG in an optical resonator and make both such beams incident thereinto, resulting in an enhancement in photon density. It is necessary for an enhancement in intensity of ECDL to excite a Ti:Sapphire crystal by a double wave of another Nd:YAG laser to thereby amplify ECDL light. Control of resonators for performing them is required, and an increase in device size is caused and operations are complicated. In contrast, a light generator according to an embodiment of the present invention is configured from a single fiber laser light source, an optical fiber having a length of several meters, and a nonlinear optical crystal, and thus has a compact size and is easy to carry and operate. Since a plurality of light beams are generated from a single light source, these beams exhibit the same width and timing of perturbation, and thus the perturbation of optical frequency can be readily cancelled through difference frequency generation without a perturbation controller.

In some embodiments, a laser beam may be transmitted through air between the optical resonator and the coupling node of the first optical fiber with the second optical fiber. Alternatively, the optical path between the optical resonator and the coupling node may optionally be provided with an optical transmission device including an optical system for convergence and/or divergence of a laser beam through a lens.

Since an optical comb may be obtained in the present analysis within the scope where the wavelength region for analysis of $^{14}C$ is covered, the present inventors have focused on the following: higher-power light is obtained with a narrower oscillation spectrum of an optical comb light source. A narrower oscillation spectrum can allow for amplification with amplifiers different in band and use of a nonlinear optical crystal long in length. The present inventors have then made studies, and as a result, have conceived that high-power irradiation light having the absorption wavelength of carbon dioxide isotope is generated based on the difference in frequency, by generating a plurality of light beams different in frequency, from a single light source, (B) amplifying intensities of the plurality of light beams obtained, by use of amplifiers different in band, respectively, and (C) allowing the plurality of light beams to propagate through a nonlinear optical crystal longer in length than a conventional nonlinear optical crystal, in generation of an optical comb by use of a difference frequency generation method. The present invention has been completed based on the above finding. There has not been reported any conventional difference frequency generation method that amplifies the intensity of light with a plurality of amplifiers different in band and provides high-power irradiation light obtained by use of a crystal long in length.

Absorption of light by a light-absorbing material, in the case of a high intensity of an absorption line and also a high intensity of irradiation light, is remarkably decreased in low level corresponding to the absorption of light and appears to be saturated with respect to the effective amount of light absorption (called saturation absorption). According to a SCAR theory (Saturated. Absorption CRDS), in the case where light of a 4.5-μm wavelength range, high in intensity of an absorption line, is applied to a sample such as $^{14}CO_2$ in an optical resonator, a large saturation effect is initially exhibited due to a high intensity of light accumulated in an optical resonator and a small saturation effect is subsequently exhibited due to a gradual reduction in intensity of light accumulated in an optical resonator according to progression of decay, with respect to a decay signal (ring-down signal) obtained. Thus, a decay signal where such a saturation effect is exhibited is not according to simple exponential decay. According to such a theory, fitting of a decay signal obtained in SCAR enables the decay rate of a sample and the decay rate of the back ground to be independently evaluated, and thus not only the decay rate of a sample can be determined without any influence of the variation in decay rate of the back ground, for example, due to the parasitic etalon effect, but also absorption of light by $^{14}CO_2$ can be more selectively measured due to the saturation effect of $^{14}CO_2$ larger than that of a gaseous contaminant. Accordingly, use of irradiation light higher in intensity is more expected to result in an enhancement in sensitivity of analysis. The light generator of the present invention can generate irradiation light high in intensity, and thus is expected to result in an enhancement in sensitivity of analysis in the case of use for carbon isotope analysis.

<Arithmetic Device>

The arithmetic device 30 may be of any type that can determine the concentration of a light-absorbing substance in the optical resonator based on the decay time and ringdown rate and calculate the concentration of the carbon isotope from the concentration of the light-absorbing substance.

The arithmetic device 30 includes an arithmetic controller 31, such as an arithmetic unit used in a common computer system (e.g., CPU); an input unit 32, such as a keyboard or a pointing device (e.g., a mouse); a display unit 33, such as an image display (e.g., a liquid crystal display or a monitor); an output unit 34, such as a printer; and a memory unit 35, such as a ROM, a RAM, or a magnetic disk.

A pretreatment method in the AMS, which is a typical measurement of radioactive carbon isotope prior to the present invention, is compared with the pretreatment method based on the principle shown in FIG. 2 in the carbon dioxide isotope generator 40 of the present invention.

The pretreatment method in the AMS involves a preparative step of washing and dilution of a sample of interest, a conversion step of converting the pretreated sample to carbon dioxide, a reduction step, and a press step. To test 100 samples, AMS requires two operators and at least 6 to 7 days. The cost for measurement is 4 million yen (40 thousand yen per analyte, refer to document published by Accelerator Analysis Center).

In contrast, the pretreatment method by CRDS of the present application involves a step of removing biologically derived carbon from a biological sample, a step of converting the pretreated biological sample to carbon dioxide, a step of purification (concentration and removal of gaseous contaminant), and a step of dehumidification and cooling. In the case of measurement of 100 samples, the step of converting the biological sample to carbon dioxide and the succeeding steps can be automated, and hence these samples can be measured by an operator within a day or two days. The estimated cost for measurement is a million yen or less (several hundred to several thousand yen per sample).

An apparatus of the AMS requires a dedicated building with an area about half a tennis court, while a device of the CRDS has a reduced installation area corresponding to the desktop with increased flexibility of arrangement.

Pretreatment methods for LSC and AMS, which are typical measurements of radioactive carbon isotope prior to the present invention, are compared with the pretreatment method based on the principle shown in FIG. 2 in the carbon dioxide isotope generator 40 of the present invention.

The pretreatment step in the case of measurement of the biological sample by the LSC requires several minutes to about 28 hours, while the treatment time varies depending on the type of the biological sample. The pretreatment methods of urine and blood are exemplified as follows.

Before urine is subjected to LSC measurement, such a urine sample may be diluted with distilled water, if necessary. Such a pretreatment requires several minutes.

The LSC involves detection of fluorescence from a scintillator receiving radiation rays from the sample and thus determination of the radiation dose in the LSC measurement of blood, a pigment derived from the blood may interfere with the fluorescent light and thus hinder the accurate determination. In such a case, a tissue solubilizer Soluene-350 (Perkin Elmer) is added to a blood sample, the system is heated at 40° C. to 60° C. for several hours, and hydrogen peroxide (30%) is added to decolorize the blood pigment, in some cases. This pretreatment requires about 4 to 24 hours. An alternative pretreatment method involves drying a blood sample, oxidative combustion of carbon in the sample, into carbon dioxide, and trapping of the resulting carbon dioxide with, for example, amine.

The pretreatment requires about 4 to 24 hours.

The pretreatment process for AMS measurement of a biological sample involves first to fifth steps as schematically described below. Examples of the biological sample include blood, plasma, urine, feces, and bile.

The first step involves optional dilution of a biological sample with a diluent, and fractionation of the diluted sample. The preferred diluent is, for example, ultrapure water or a blank sample.

The second step involves oxidation of the fractionated sample to convert carbon contained in the sample into carbon dioxide.

The third step involves isolation and purification of carbon dioxide from, for example, water or nitrogen. The carbon content of the purified carbon dioxide is quantitatively determined.

The fourth step involves the reduction of the purified carbon dioxide into graphite. For example, carbon dioxide is mixed with iron powder and hydrogen gas (i.e., reductants), and the mixture is heated in an electric furnace for reducing carbon dioxide into graphite.

The fifth step involves compression of the resultant graphite.

The pretreatment process requires about six days.

The pretreatment process for LSC requires several minutes to about 28 hours and the pretreatment process for AMS requires about six days. In contrast, the step of generating carbon dioxide according to this embodiment requires several minutes to about 28 hours. Examples of the pretreatment process involve dilution, extraction, and concentration. In principle, the pretreatment process is performed until the conversion of carbon contained in an analyte into carbon dioxide through complete combustion of the carbon. According to the present embodiment, the pretreatment time can be reduced to several minutes to about 1.5 hours per analyte. For example, the pretreatment process does not need the tissue solubilization step and the decolorization step in CRDS measurement, such steps being essential for LSC measurement of a blood sample. The pretreatment process accordingly requires several minutes to about 1.5 hours per analyte.

Although the carbon isotope analysis device according to the first aspect has been described above, the configuration of the carbon isotope analysis device should not be limited to the embodiment described above, and various modifications may be made. Other aspects of the carbon isotope analysis device will now be described by focusing on modified points from the first aspect.

[Second Aspect of Carbon Isotope Analysis Device]
<Cooler and Dehumidifier>

FIG. 6 is a conceptual view of a second aspect of the carbon isotope analysis device. As illustrated in FIG. 6, a spectrometer 1a may further include a Peltier element 19 that cools an optical resonator 11, and a vacuum device 18 that accommodates the optical resonator 11. Since the light absorption of $^{14}CO_2$ has temperature dependence, a decrease in temperature in the optical resonator 11 with the Peltier element 19 facilitates distinction between $^{14}CO_2$ absorption lines and $^{13}CO_2$ and $^{12}CO_2$ absorption lines and enhances the $^{14}CO_2$ absorption intensity. The optical resonator 11 is disposed in the vacuum device 18, and thus the optical resonator 11 is not exposed to external air, leading to a reduction in effect of the external temperature on the resonator 11 and an improvement in analytical accuracy.

The cooler for cooling the optical resonator 11 may be, for example, a liquid nitrogen vessel or a dry ice vessel besides the Peltier element 19. The Peltier element 19 is preferably used in view of a reduction in size of a spectrometer 10, whereas a liquid nitrogen vessel or a dry ice vessel is preferably used in view of a reduction in production cost of the device.

The vacuum device 18 may be of any type that can accommodate the optical resonator 11, apply irradiation light from the light generator 20 to the optical resonator 11, and transmit light transmitted, to the photodetector.

A dehumidifier may be provided. Dehumidification may be here carried out with a cooling means, such as a Peltier element, or a membrane separation method using a polymer membrane, such as a fluorinated ion-exchange membrane, for removing moisture.

In the case that the carbon isotope analysis device 1 is used in a microdose test, the prospective detection sensitivity to the radioactive carbon isotope $^{14}C$ is approximately 0.1 dpm/ml. Such a detection sensitivity "0.1 dpm/ml" requires not, only use of "narrow-spectrum laser" as a light source, but also the stability of wavelength or frequency of the light source. In other words, the requirements include no deviation from the wavelength of the absorption line and a narrow line width. In this regard, the carbon isotope analysis device 1, which involves CRDS with a stable light source using "optical frequency comb light", can solve such a problem. The carbon isotope analysis device 1 has an advantage in that the device can determine a low concentration of radioactive carbon isotope in the analyte.

The earlier literature (Hiromoto Kazuo et al., "Designing of $^{14}C$ continuous monitoring based on cavity ring down spectroscopy", preprints of Annual Meeting, the Atomic Energy Society of Japan, Mar. 19, 2010, p. 432) discloses determination of the concentration of $^{14}C$ in carbon dioxide by CRDS in relation to monitoring of the concentration of spent, fuel in atomic power generation. Although the signal processing using the fast Fourier transformation (FFT) disclosed in the literature has a high processing rate, the fluctuation of the baseline increases, and thus a detection sensitivity of 0.1 dpm/ml cannot be readily achieved.

Figure 7:
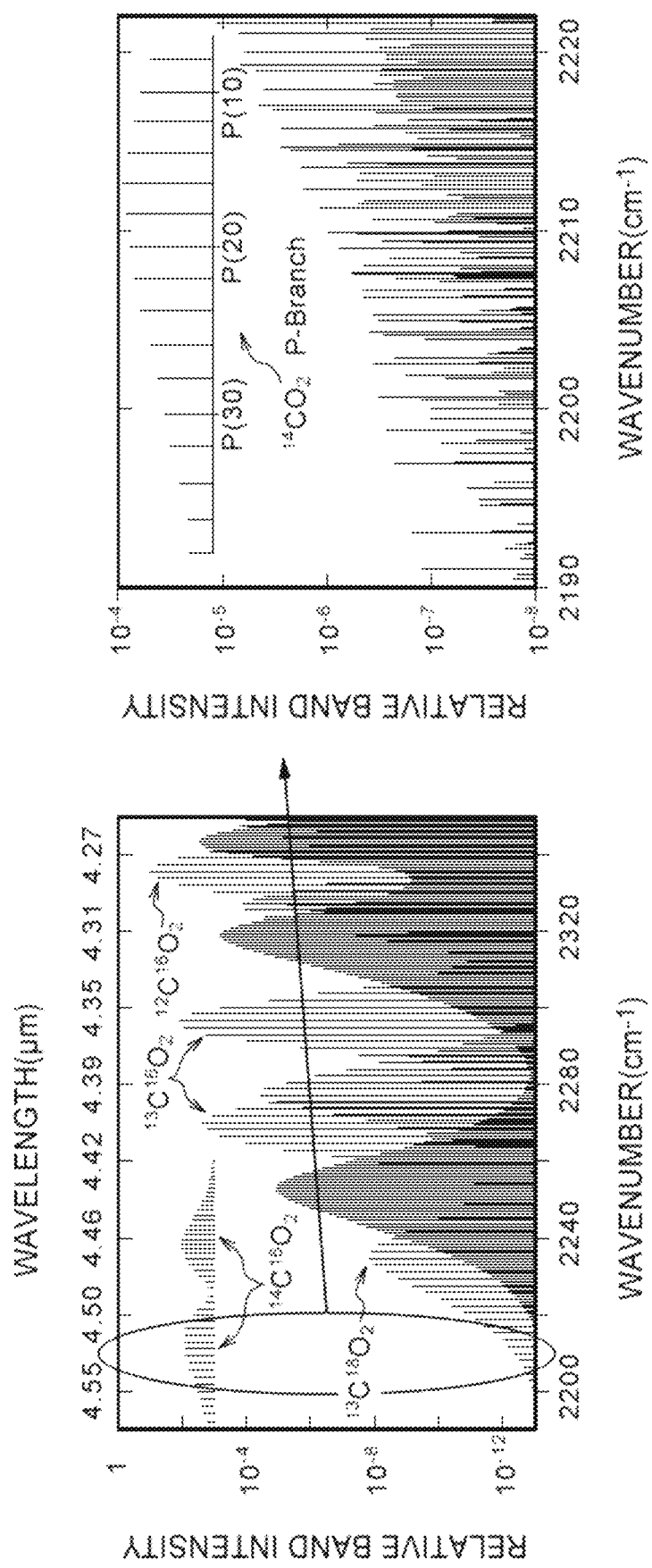
FIG. 7 illustrates the relation between the absorption wavelength and the absorption intensity of an analytical sample.

FIG. 7 (cited from Applied Physics Vol. 24, pp. 381-386, 1981) illustrates the relationship between the absorption wavelength and absorption intensity of analytical samples $^{12}C^{16}O_2$, $^{13}C^{18}O_2$, $^{13}C^{16}O_2$, and $^{14}C^{16}O_2$. As illustrated in FIG. 7, each carbon dioxide isotope has distinct absorption lines. Actual absorption lines have a finite width caused by the pressure and temperature of a sample. Thus, the pressure and temperature of a sample are preferably adjusted to atmospheric pressure or less and 273K (0° C.) or less, respectively.

Since the absorption intensity of $^{14}CO_2$ has temperature dependence as described above, the temperature in the optical resonator 11 is preferably adjusted to a minimum possible level. In detail, the temperature in the optical resonator 11 is preferably adjusted to 273K (0° C.) or less. The temperature may have any lower limit. In view of cooling effect and cost, the temperature in the optical resonator 11 is adjusted to preferably 173K to 253K (−100° C. to −20° C.), more preferably about 233K (−40° C.)

The spectrometer may further be provided with a vibration damper. The vibration damper can prevent a perturbation in distance between the mirrors due to the external vibration, resulting in an improvement in analytical accuracy. The vibration damper may be an impact absorber (polymer gel) or a seismic isolator. The seismic isolator may be of any type that can provide the spectrometer with vibration having a phase opposite to that of the external vibration.

<Delay Line>

As illustrated in FIG. 6, a delay line 28 (optical path difference adjuster) may be provided on the first optical fiber 21. Thus, fine adjustment of the wavelength of light generated on the first optical fiber 21 is facilitated, and the maintenance of the light generator is facilitated.

Figure 8:
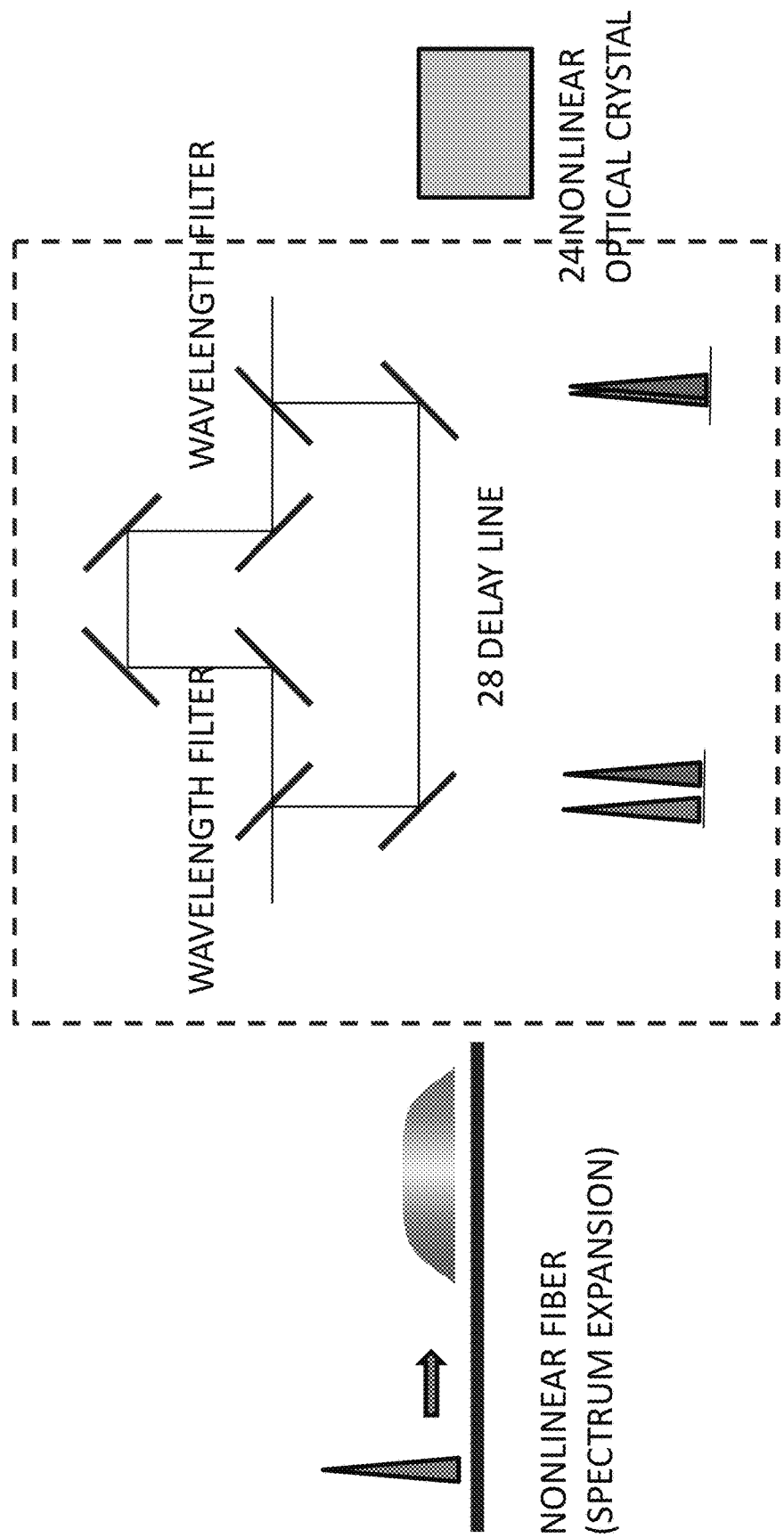
FIG. 8 illustrates the principle of mid-infrared comb generation by use of one optical fiber.

FIG. 8 illustrates the principle of mid-infrared comb generation by use of one optical fiber. A delay line 28 is described with reference to FIG. 6 and FIG. 8. The carbon isotope analysis device 1 in FIG. 6 includes a delay line 28 including a plurality of wavelength filters between the light source 23 and the nonlinear optical crystal 24. The first optical fiber 21 transmits the light from the light source 23, and the spectrum is expanded (spectrum expansion). If the spectral components have a time lag, the delay line 28 (optical path difference adjuster) splits the spectral components and adjusts the relative time delays, as illustrated in FIG. 6. The spectral components can be focused on a nonlinear crystal 25 to thereby generate a mid-infrared comb.

While such a delay line is exemplified as the wavelength filter, a dispersion medium may also be used without any limitation thereto.

<Light Shield>

In the aforementioned embodiment, the distance between the mirrors is adjusted with the piezoelectric element 13 for generation of ring-down signals in the spectrometer 10. For generation of ring-down signals, a light shield may be provided in the light generator 20 for ON/OFF control of light incident on the optical resonator 11. The light shield may be of any type that can promptly block light having the absorption wavelength of the carbon dioxide isotope. Example of the light shield is an optical switch 29 illustrated in FIG. 6. The excitation light should be blocked within a time much shorter than the decay time of light in the optical resonator.

Example 1

Figure 9:
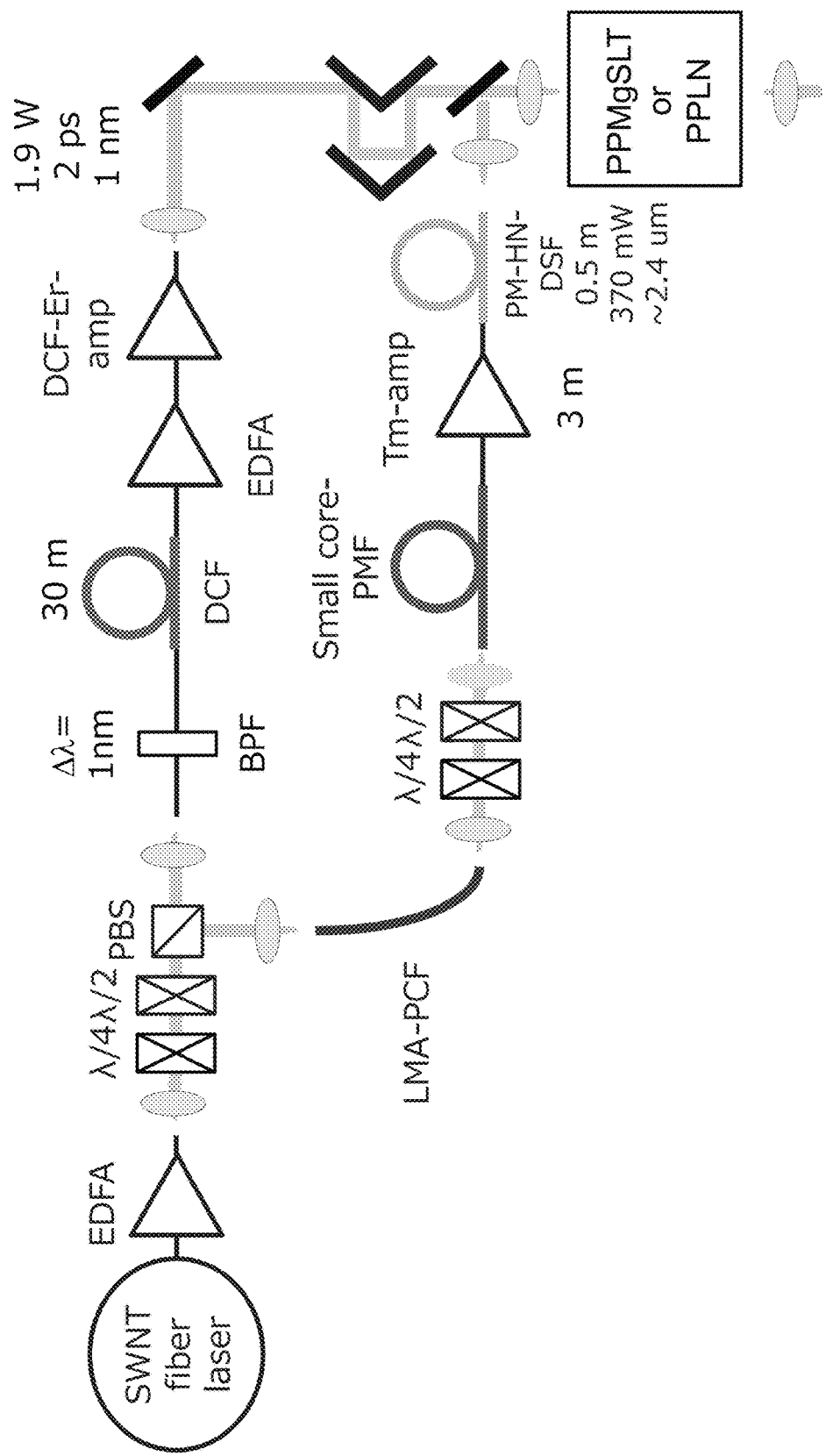
FIG. 9 illustrates an Er-doped fiber-laser-based mid-infrared (MIR) comb generation system 1.

FIG. 9 illustrates an Er-doped fiber-laser-based mid-infrared (MIR) comb generation system 1. A device corresponding to an element 20B in FIG. 6 was assembled, and an experiment was performed. The light source used was a high repetition rate ultrashort pulse fiber laser by use of a single-wall carbon nanotube (SWNT) film and 980-nm ID as an excitation laser, where the repeated frequency was 160 MHz and the wavelength of light emitted was 1.55 µm. The light emitted from the light source was input as seed light, amplified by an Er-doped fiber amplifier (EDFA) and split to two beams by a polarization beam splitter (PBS).

Figure 10A:
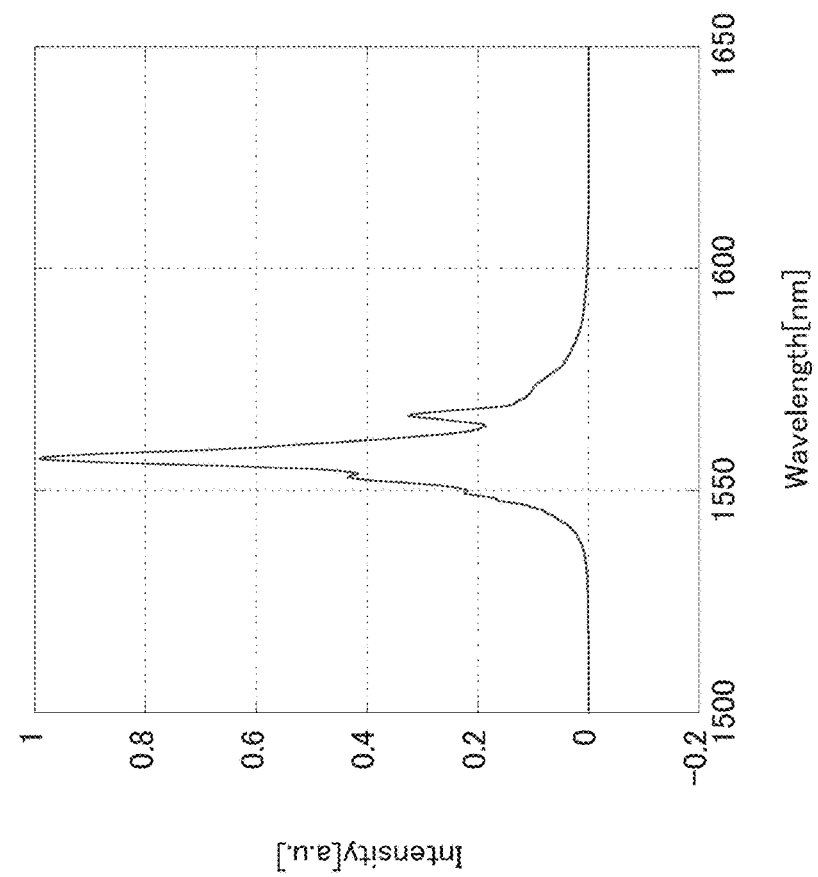
FIGS. 10A and 10B are each a spectrum diagram at a shorter wavelength.
Figure 10B:
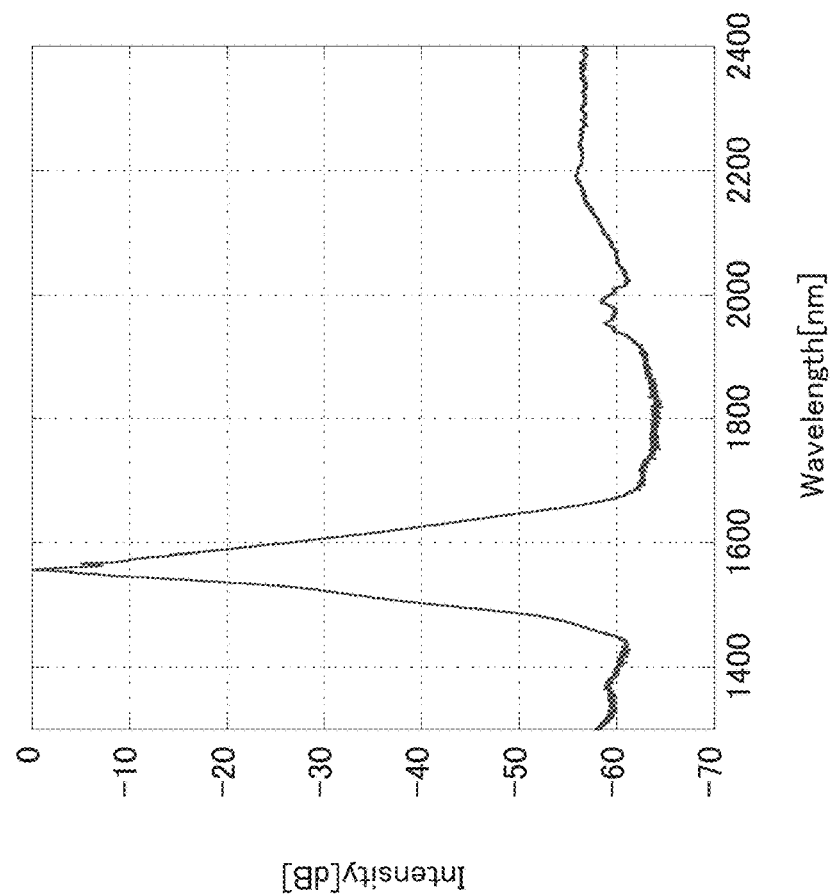

Chirped pulse amplification was performed by an amplifier (DCF-Er-amp) using a dispersion-compensating fiber (DCF), EDFA, and an Er:Yb-doped double-clad fiber on one shorter wavelength route (first optical fiber). An ultrashort pulse was generated where the average output was 2 W, the pulse width was 2 ps and the center wavelength was 1555 nm, as illustrated in FIGS. 10A and 10B.

The delay line illustrated, which could be subjected to fine correction of the wavelength, was not particularly subjected to such correction in the present experiment.

Figure 11A:
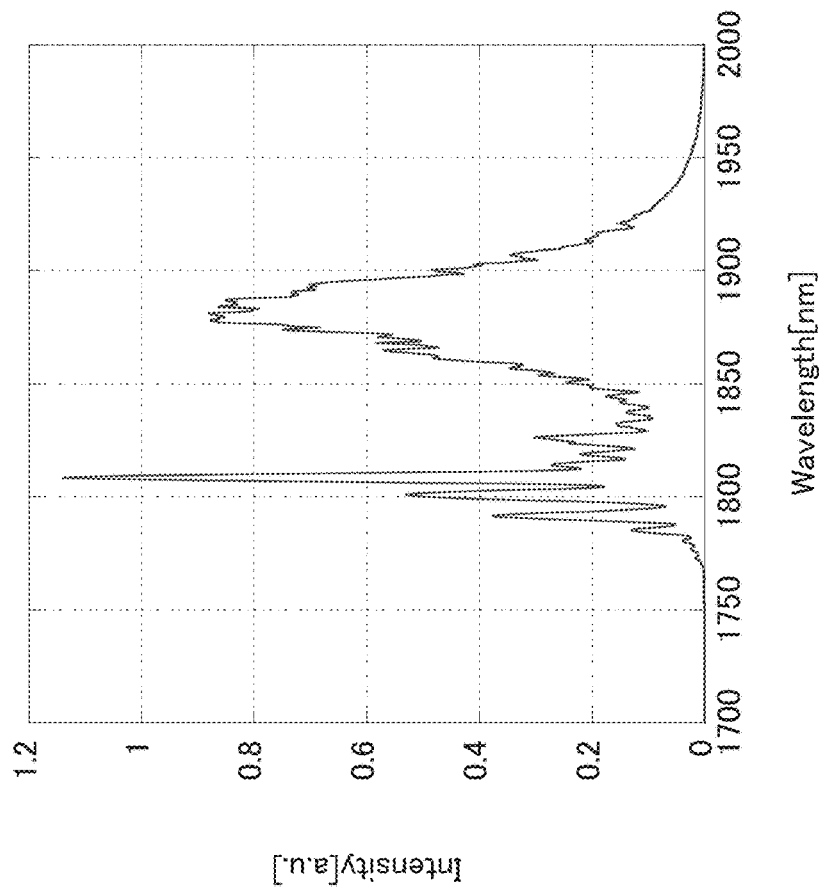
FIGS. 11A and 11B are each a spectrum diagram at a longer wavelength.
Figure 11B:
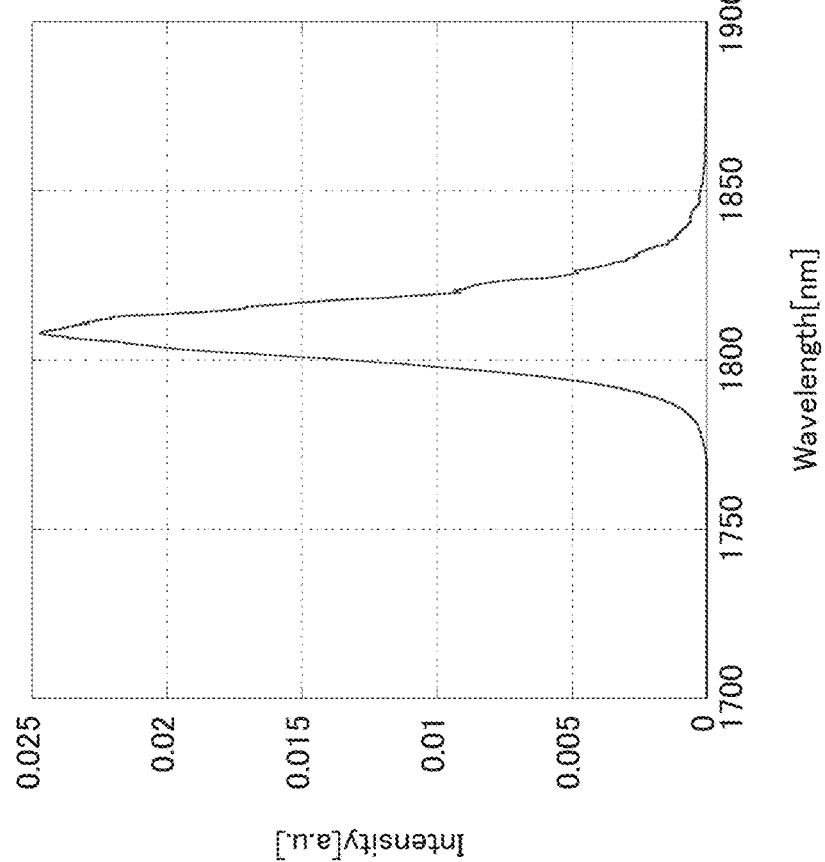
Figure 12:
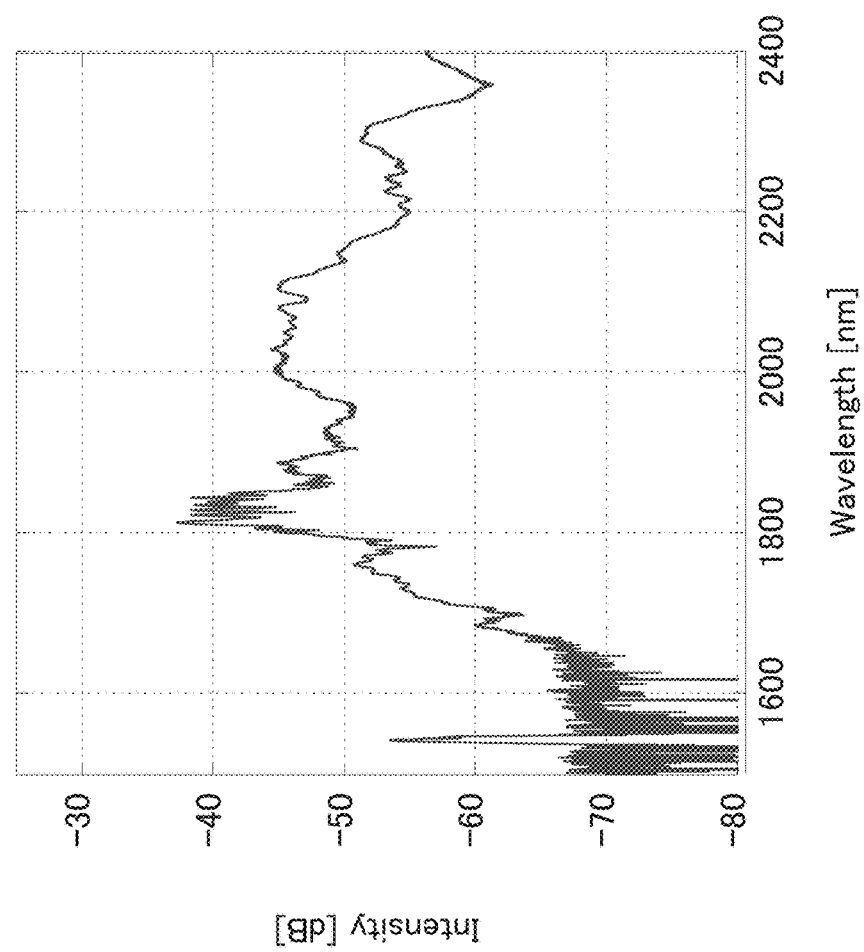
FIG. 12 is a spectrum diagram at a longer wavelength.

The following was performed on other longer wavelength route (second optical fiber): the dispersion of light pulses amplified by use of a large-mode-area photonic crystal fiber (LMA-PCF) was compensated, ultrashort light pulses high in intensity were generated, the wavelength was then shifted to about 1.85 µm by a small core polarization-maintaining fiber (Small core PMF) as illustrated in FIG. 11A, and the light was amplified by a Tm-doped fiber amplifier (TDFA) as illustrated in FIG. 11B. Furthermore, wavelength conversion. (expansion) was performed by a polarization maintaining highly nonlinear dispersion shifted fiber (PM-HN-DSF). As illustrated in FIG. 12, supercontinuum (SC) light having an average output of 300 mW and expanding in a wavelength range from 1700 to 2400 nm (1.7 to 2.4 µm) was generated in the present. Example, a component of a wavelength range from 2.3 to 2.4 um was used.

Figure 13:
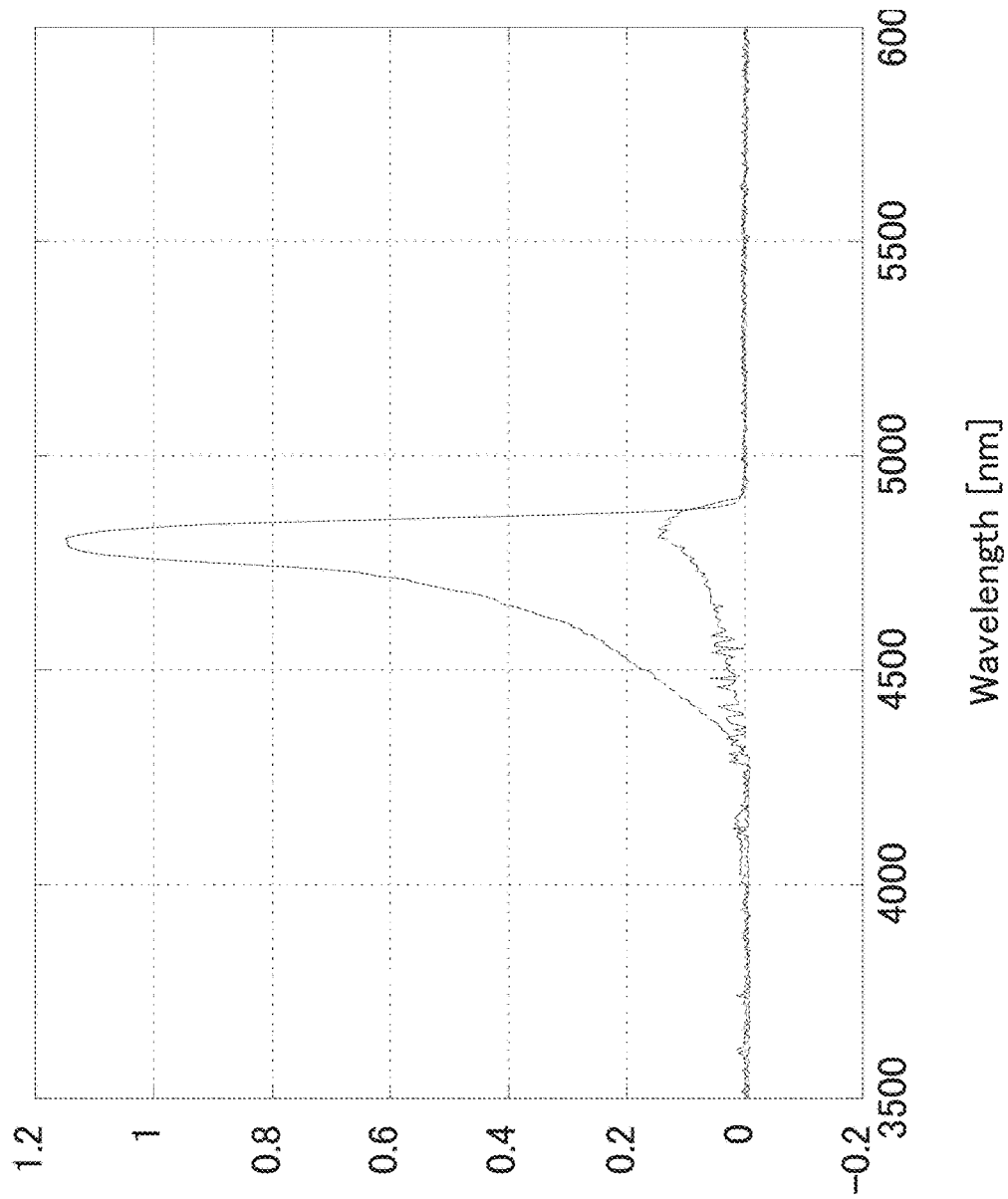
FIG. 13 is a light spectrum diagram of a mid-infrared comb generated.

Finally, difference frequency generation was performed by making each light output from the two routes, incident perpendicularly to the S1 surface of a nonlinear optical crystal (PPMgSLT manufactured by Oxide Corporation. (Nonlinear Coefficient (deff)>7.5 pm/V, Typical PMT 44+/−5 degree C., AR Coat S1&S2 R<0.5% at 1064/532 nm, Crystal Size (T×W) 1 mm×2 mm, Crystal Length (L) 40 mm)) having a length in the longitudinal direction of 40 mm. As a result, a mid-infrared optical frequency comb of a wavelength range from 4400 to 4800 nm (4.5 µm), as illustrated in FIG. 13, was generated with being emitted from the S2 surface.

Figure 16A:
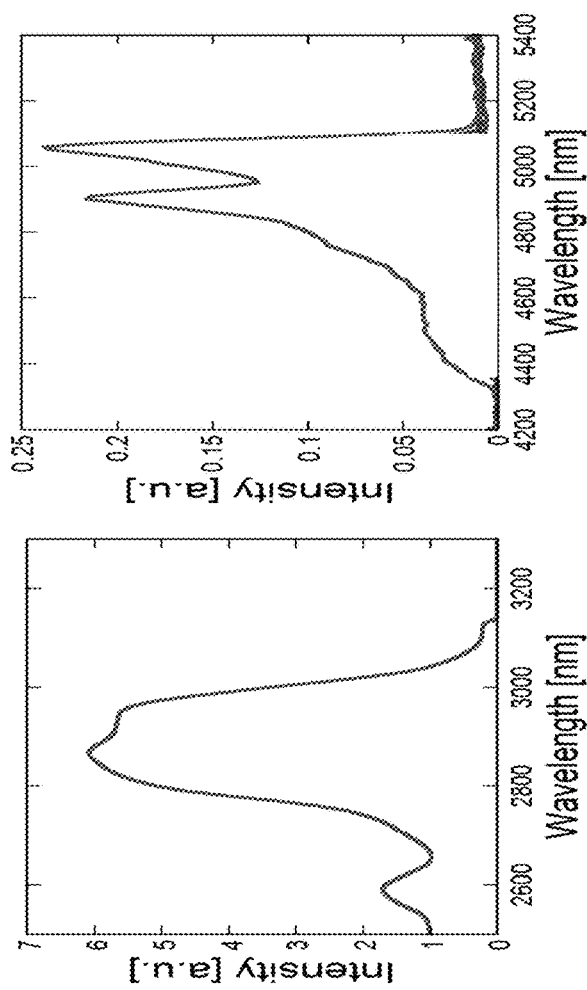
FIGS. 16A and 16B are light spectrum diagrams diagram of a mid-infrared comb generated by a conventional difference frequency generation method.
Figure 16B:
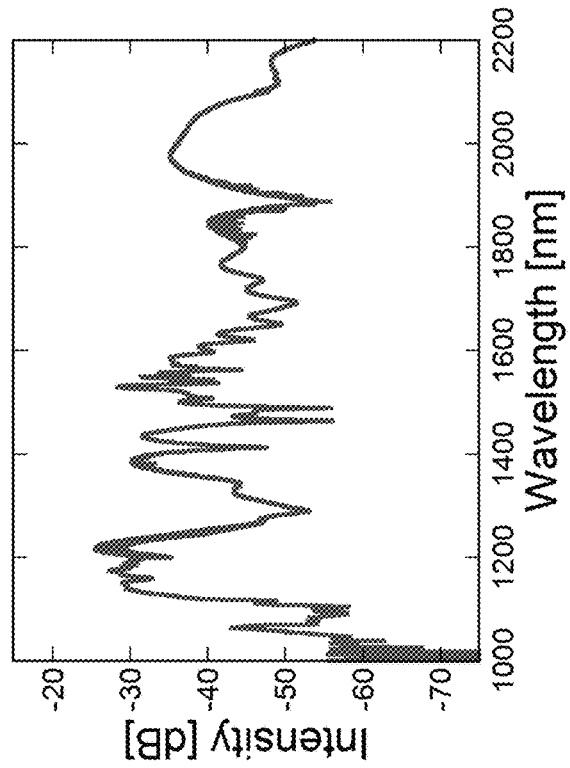

A narrower half-value width and a higher intensity were exhibited than those in a light spectrum diagram of a mid-infrared comb, illustrated in FIG. 16 and created by a conventional method. A polarization maintaining highly nonlinear dispersion shifted fiber is added to a rear stage of TDFA to thereby not only enhance the selectivity of light of an objective wavelength, but also efficiently provide desired light having a high intensity.

A mid-infrared optical frequency comb having a peak at a wavelength of 4800 nm was generated in the present Example 1. A mid-infrared optical frequency comb having a peak at a wavelength of 4500 nm can be generated by adjusting properties of the spectrum of light on a longer wavelength route and/or of a shorter wavelength.

Figure 14:
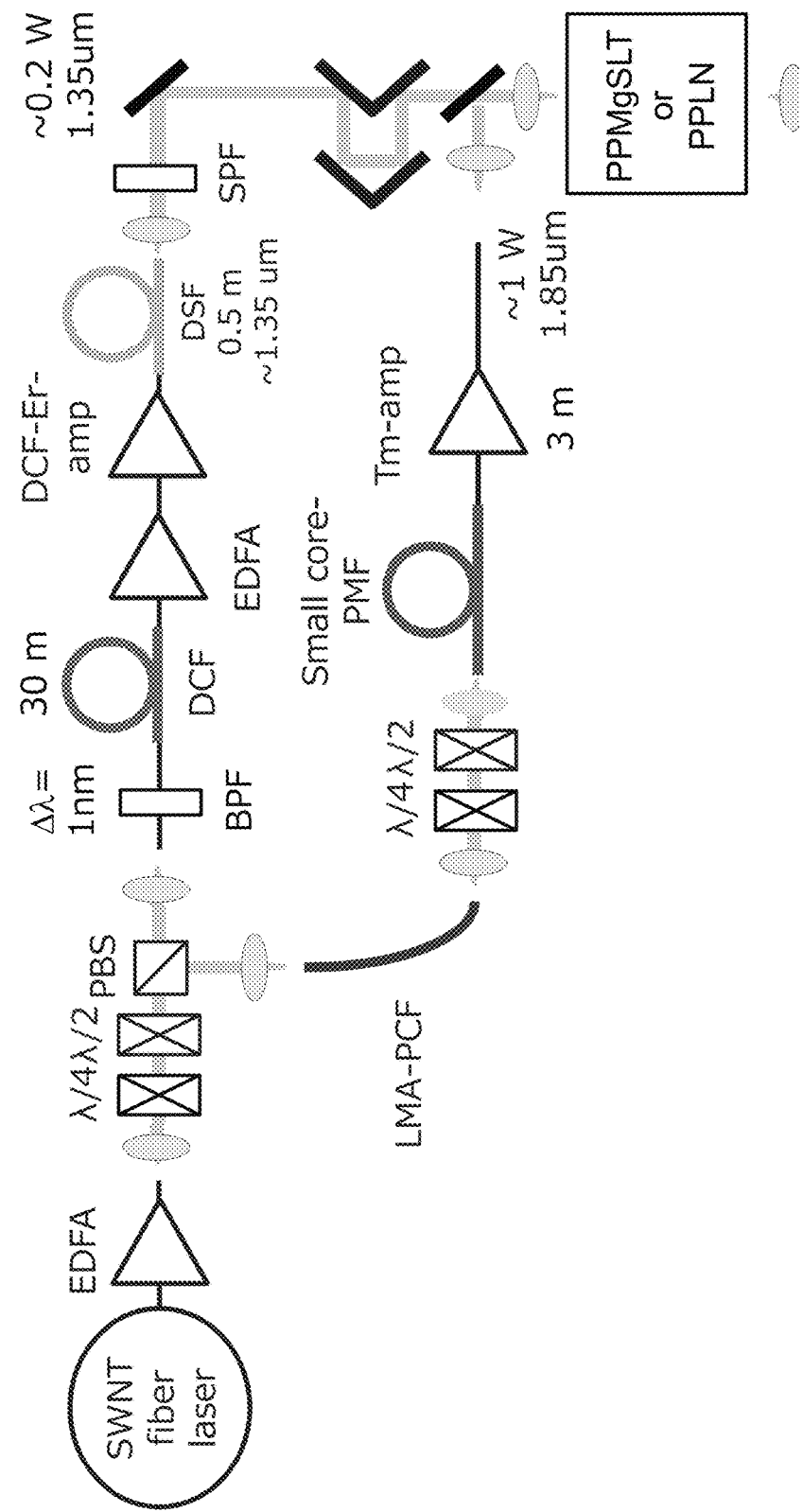
FIG. 14 illustrates an Er-doped fiber-laser-based mid-infrared (MIR) comb generation system 2.

A mid-infrared optical frequency comb in a 4500-nm wavelength range can also be generated by further providing a dispersion shifted fiber (DSF) and SPF between the Er:Yb-doped double-clad fiber and the delay line on a shorter wavelength route in FIG. 9 (a component of a 1.35-µm wavelength range is used), removing PM-HN-DSF on a longer wavelength route, and forming an Er-doped fiber-laser-based mid-infrared (MIR) comb generation system 2 as illustrated in FIG. 14. According to such a configuration, such a shifted fiber is added to a rear stage of EDFA to thereby not only enhance the selectivity of light of an objective wavelength, but also efficiently provide desired light at a high intensity. It is thus preferred to control the wavelength of incident light in advance in order to use a nonlinear crystal preferably used to provide desired light of 4.5-µm wavelength range.

[Third Aspect of Carbon Isotope Analysis Device]

<Light Generator Including Light Source Other Than Optical Comb, as Main Light Source>

It has been conventionally considered that, since a quantum cascade laser (QCL) has perturbation of oscillation wavelength and absorption wavelengths of $^{14}C$ and $^{13}C$ are adjacent, the QCL is difficult to use as a light source of a carbon isotope analysis device for use in $^{14}C$ analysis. Thus, the present inventors have uniquely developed an optical comb light source that generates an optical comb from a single light source and thus have completed a compact and convenient carbon isotope analysis device (see Patent Document 2).

The present inventors have completed a light generator that generates narrow-lane width and high-output (high-intensity) light, in order to achieve a further enhancement in analytical accuracy of a carbon isotope analysis device. The present inventors have made studies about a further application of the light generator, and as a result, have conceived that perturbation of oscillation wavelength of light generated from QCL is corrected by a beat signal measurement device where narrow-line width light generated from the light generator is used as a frequency reference. The inventors have progressively made studies based on the finding, and as a result, have completed a compact, convenient, and highly-reliable light generator where a light source other than an optical comb is adopted as a main light source, and a carbon isotope analysis device by use of the light generator.

Figure 15:
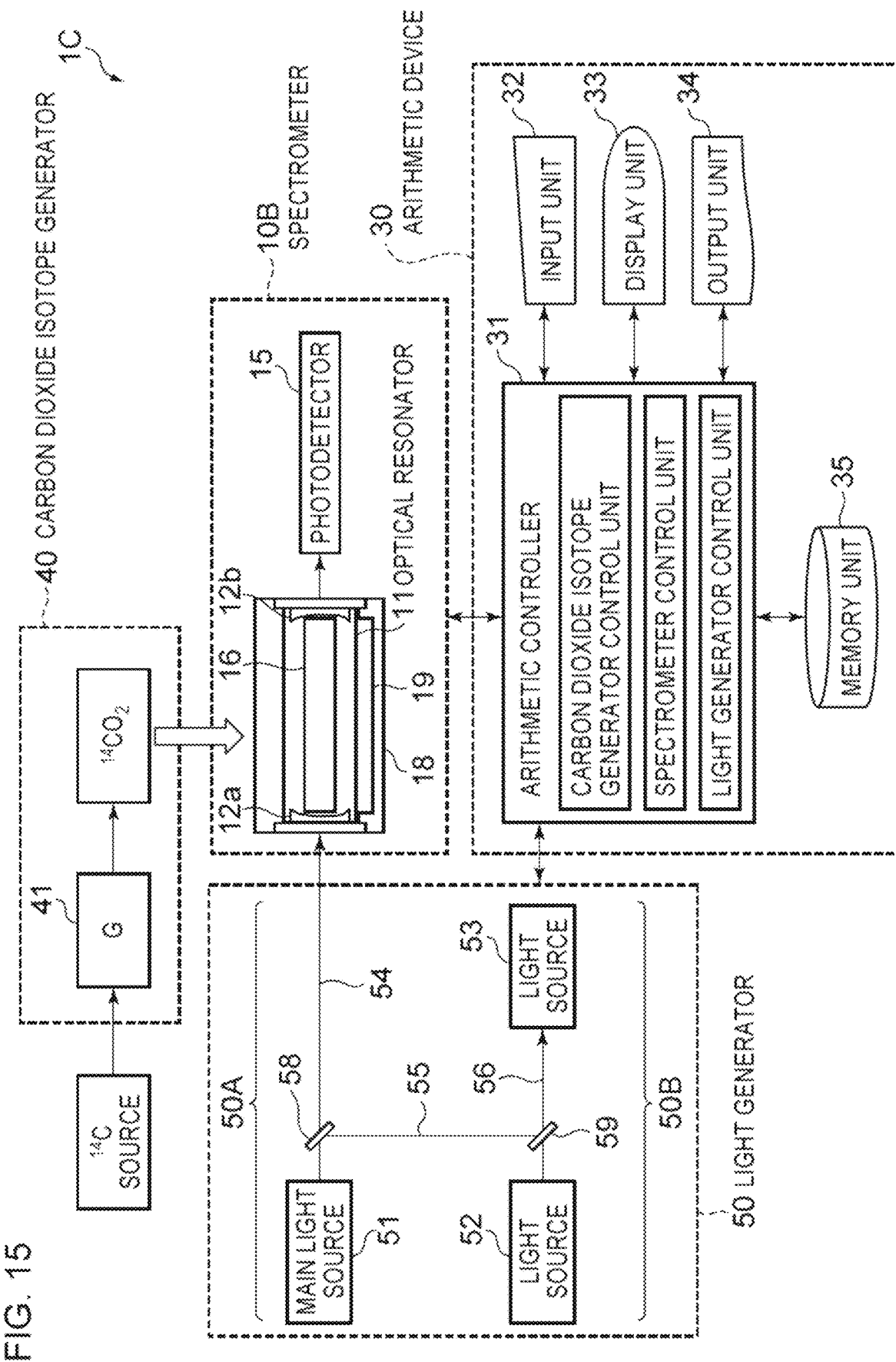
FIG. 15 is a conceptual view of a third embodiment of a carbon isotope analysis device.

FIG. 15 schematically illustrates a carbon isotope analysis device 1C according to a third aspect. The carbon isotope analysis device 1C is obtained by replacing the light generator 20A in FIG. 1 with a light generator 50 in FIG. 15, and includes a carbon dioxide isotope generator 40, the light generator 50 and a spectrometer 10, and also an arithmetic device 30.

The light generator 50 includes:
a light generator body 50A including a main light source 51 and an optical fiber 54 that transmits light from the main light source 51; and
a beat signal measurement system 50B including an optical comb source 52 that generates an optical comb of a flux of narrow-line-width light beams where the frequency region of a light beam is 4500 nm to 4800 nm, an optical fiber 56 for beat signal measurement that transmits light from the optical comb source 52, splitters 58 and 59 disposed on optical fibers 54 and 56, respectively, an optical fiber 55 that partially splits light from the main light source 51 via the splitters 58 and 59 and transmits the resultant to such an optical fiber 56 for beat signal measurement, and a photodetector 53 that measures a beat signal generated due to the difference in frequency between light from the main light source 51 and light from the optical comb source 52.

The main light source of the carbon isotope analysis device 1C including the light generator 50 is not limited to an optical comb, can be a general-purpose light source such as QCL., and thus is increased in flexibilities of design and maintenance of the carbon isotope analysis device 1C.

[Fourth Aspect of Carbon Isotope Analysis Device]
<Spectrometer Having Interference Cancellation Function by Parasitic Etalon Effect>

Figure 18A:
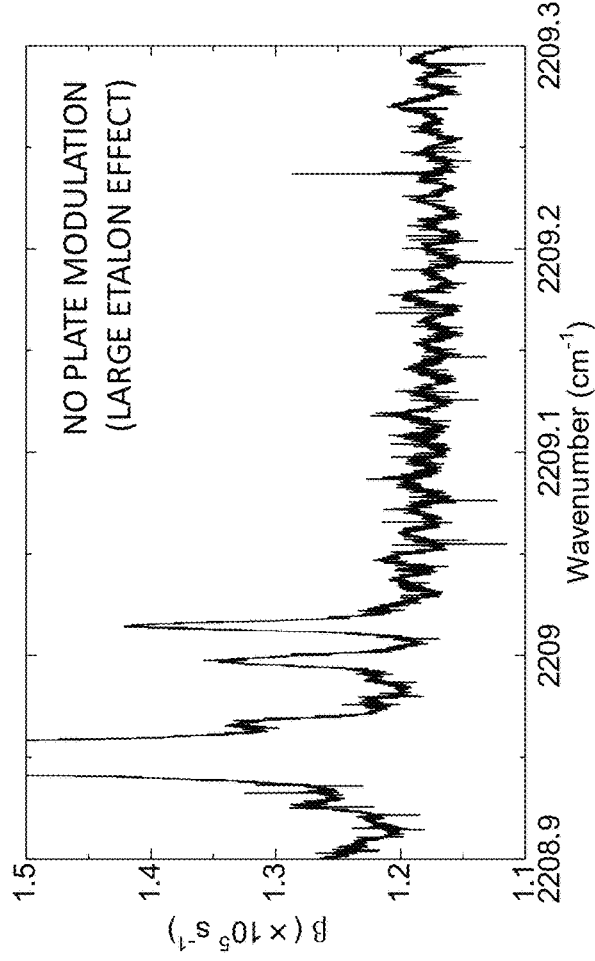
FIGS. 18A and 18B each illustrate influence of plate modulation in an interference cancellation method with the parasitic etalon effect.
Figure 18B:
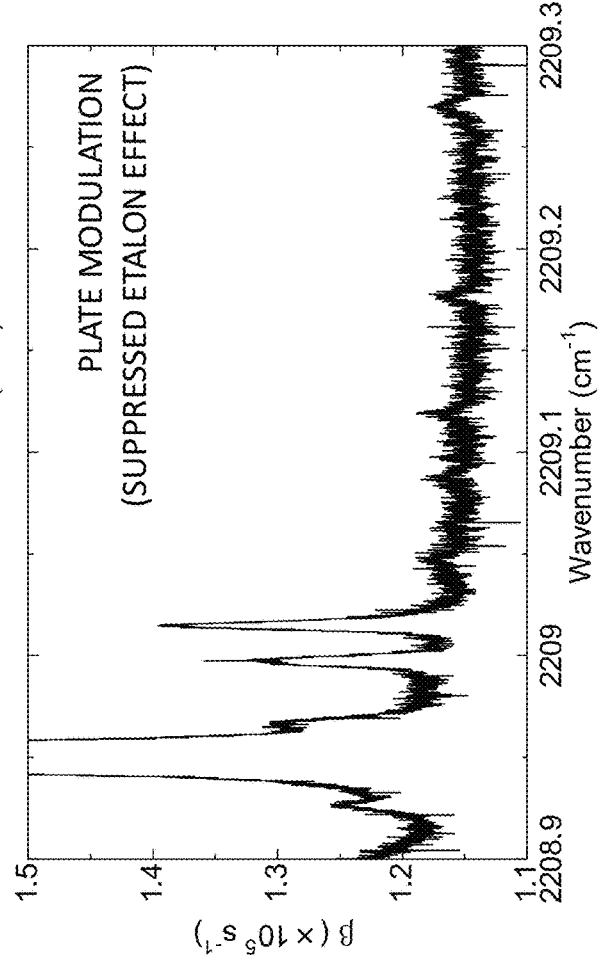

A conventional carbon isotope analysis method causes reflection between surfaces of an optical resonator and an optical component on an optical path, and causes a high noise on a baseline, due to the occurrence of the parasitic etalon effect as illustrated in FIG. 18A. The present inventors have made studies in order to decrease such a noise, and as a result, have found that the distance between surfaces of an optical resonator and an optical component on an optical path can be forcibly changed to thereby eliminate baseline drifting, as illustrated in FIG. 18B. The inventors have made further studies, and as a result, have completed a novel spectrometer and a carbon isotope analysis device including the spectrometer.

Figure 20:
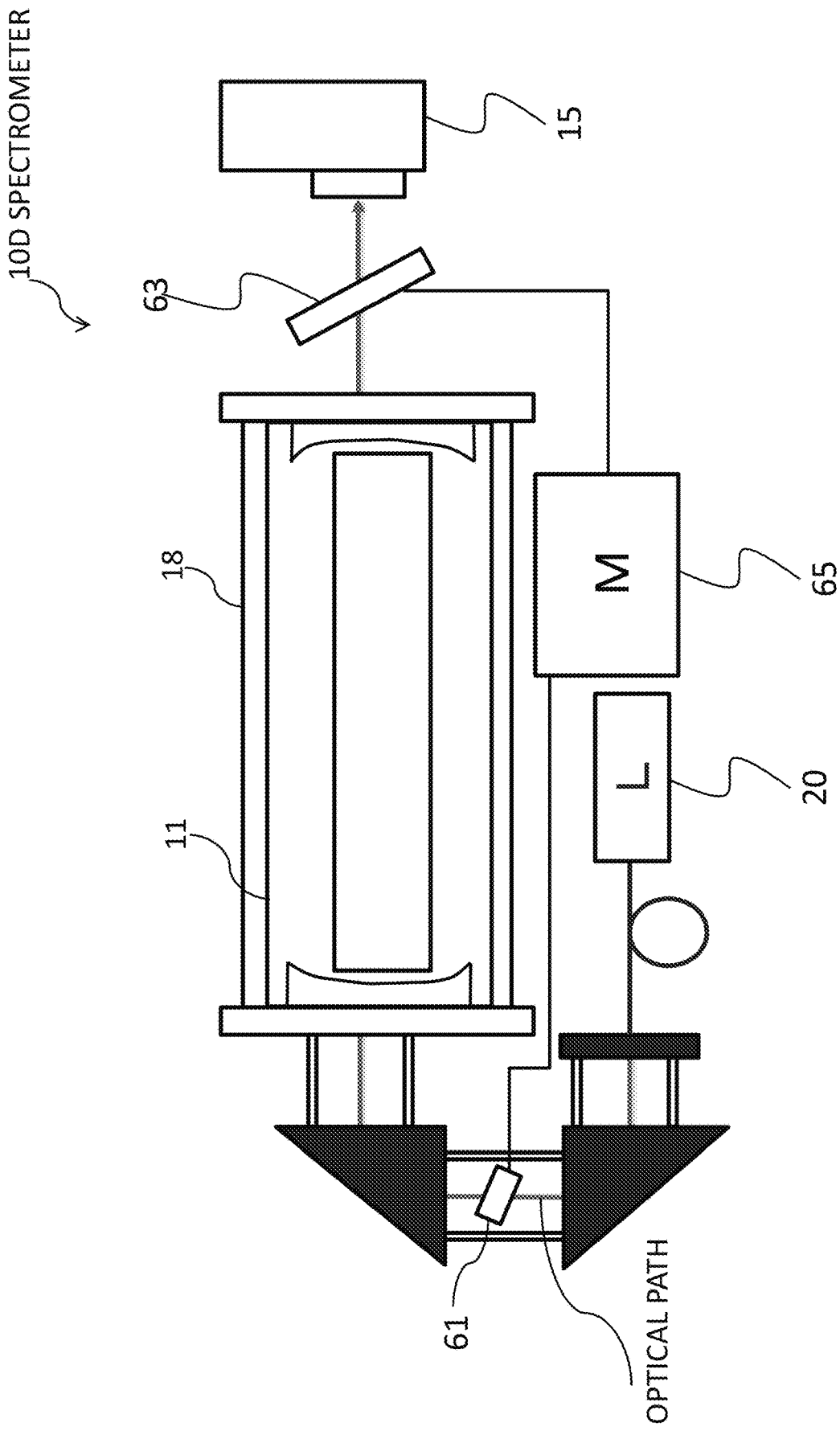
FIG. 20 is a conceptual view of a spectrometer having an interference cancellation function with the parasitic etalon effect.

FIG. 20 is a conceptual view of a spectrometer 10D. As illustrated in FIG. 20, the spectrometer 10D includes an optical resonator 11 having a pair of mirrors, a vacuum device 18 that accommodates the optical resonator 11, a photodetector 15 that determines intensity of light transmitted from the optical resonator 11, and transmission windows 61 and 63 that cancel interference due to the parasitic etalon effect. The transmission windows 61 and 63 are disposed on respective optical axes between the optical resonator 11 and a light generator 20(L) and between the optical resonator 11 and the photodetector, and a driving means 65(M) is operated to result in the change in relative distance (location) between a surface of the optical resonator 11 and a surface of an optical component on an optical path. Specifically, such a noise on a baseline, due to parasitic etalon, can be decreased by disposing the transmission windows 61 and 63 ($CaF_2$, thickness: 1 to 10 mm, transmittance: 90% or more) on both the optical paths of an inlet window and an outlet window of the vacuum device 18 that accommodates the optical resonator 11, at a Brewster's angle against the optical axes; and operating the driving means M to thereby swing a transmission window made of $CaF_2$ at 1 to 100 Hz, preferably 35 Hz and at a width of 0.05 to 5 degrees, preferably 1 degree, on the optical axes, as illustrated in FIG. 20.

Such a transmission window is not particularly limited as long as mid-infrared light is transmissive, and not only $CaF_2$ described above, but also any window produced from sapphire glass or ZnSe may be used. The transmission windows 61 and 63 are not required to be the same in material and size, and for example, the material of the transmission window 61 may be $CaF_2$ (about ½ inches) and the material of the transmission window 63 may be Si (about 1 inch). The spectrometer in FIG. 20 is configured so that the transmission windows 61 and 63 are disposed as interference cancellation units on the optical axes at both ends of the optical resonator 11, but is not limited thereto. Such interference cancellation units may be disposed on any one of the respective optical axes between the optical resonator and the light generator and between the optical resonator and the photodetector, and are preferably disposed on both the optical axes.

The spectrometer in FIG. 20 is configured so that a swingable transmission window is used as an interference cancellation unit, but is not limited thereto as long as interference due to the parasitic etalon effect can be cancelled. Not only the spectrometer in FIG. 20, but also a spectrometer 10B including an optical resonator and a cooler (Peltier device) in a vacuum device, as illustrated in FIG. 6, can be used to change the temperature of the optical resonator in a range from 0.1 to 20° C., preferably in a range 1 to 5° C., thereby decreasing such a noise on a baseline, due to parasitic etalon. The cooler can be, for example, the Peltier element, liquid nitrogen vessel or dry ice vessel described in the second aspect of the carbon isotope analysis device described above. The temperature of the optical resonator can be controlled by at least one cooler disposed in the vacuum device as long as $^{14}CO_2$ absorption lines and $^{13}CO_2$ and $^{12}CO_2$ absorption lines can be distinguished from each other and such a noise on a baseline, due to parasitic etalon, is decreased. The spectrometer may be configured to have both a transmission window and a cooler as interference cancellation units, and preferably includes any one thereof from the viewpoint of simplification of the device.

Figure 19A:
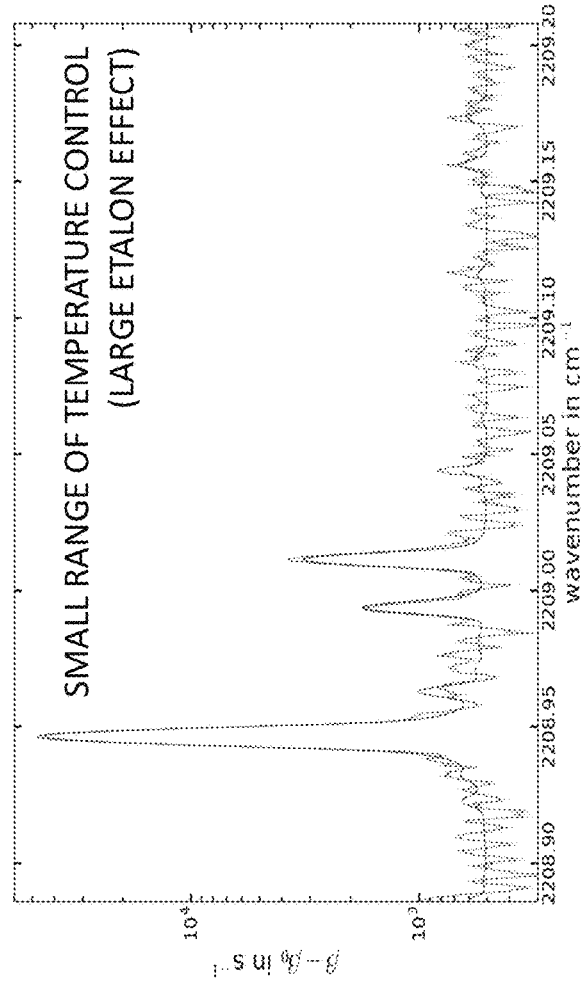
FIGS. 19A and 19B each illustrate influence of temperature control in an interference cancellation method with the parasitic etalon effect.
Figure 19B:
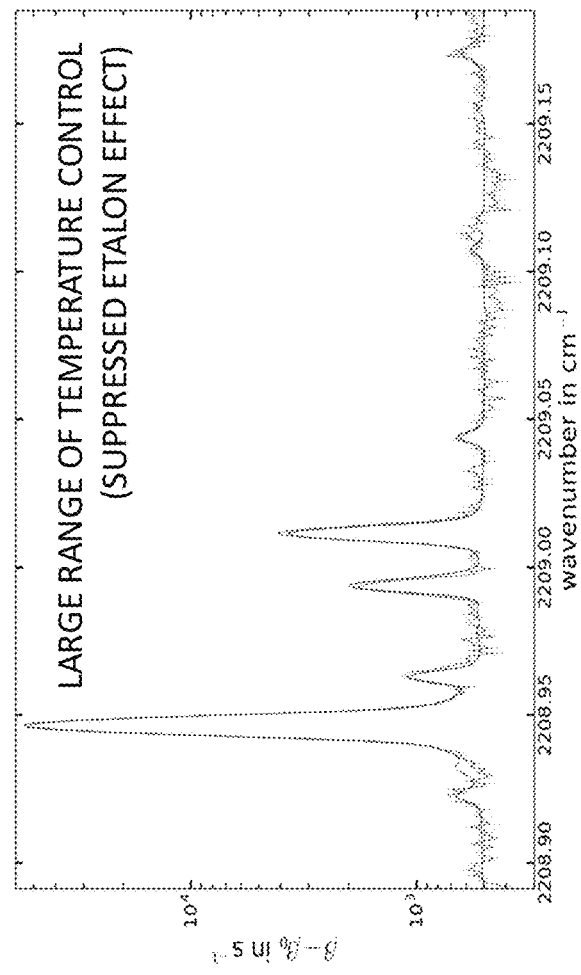

FIGS. 19A and 19B each illustrate the effect of temperature control in a method of cancelling interference due to the parasitic etalon effect. FIG. 19A. (Conventional Example) illustrates the experimental results without particular change in temperature of the resonator. FIG. 19B (Example) illustrates the results of measurement with the change in temperature of the resonator within a range of 5° C.

In the case of a small range of temperature control as illustrated in FIG. 19A, a high noise on a baseline, due to parasitic etalon, was observed. In contrast, it was found that the temperature of the resonator was controlled within a range of 5° C. as illustrated in FIG. 19B, resulting in a significant improvement in such a noise on a baseline. It has been found that, in the case where there is any variation in temperature in temperature control of the resonator, baseline correction is made by such variation with no particular temperature control means of a transmission window being provided.

The present invention provides a carbon isotope analysis device including the novel spectrometer described above. In other words, the present invention provides the carbon isotope analysis device illustrated in FIG. 1, FIG. 6, and FIG. 15, in which the novel spectrometer described above is used. Such a carbon isotope analysis device enables a noise on a baseline, due to parasitic etalon, to be decreased.

[First Aspect of Carbon Isotope Analysis Method]

The analysis of radioisotope $^{14}C$ as an example of the analyte will now be described.

(Pretreatment of Biological Sample)

(A) Carbon isotope analysis device 1 illustrated in FIG. 1 is provided. Biological samples, such as blood, plasma, urine, feces, and bile, containing $^{14}C$ are also prepared as radioisotope $^{14}C$ sources.

(B) The biological sample is pretreated to remove protein and thus to remove the biological carbon source. The pretreatment of the biological sample is categorized into a step of removing carbon sources derived from biological objects and a step of removing or separating the gaseous contaminant in a broad sense. In this embodiment, the step of removing carbon sources derived from biological objects will now be mainly described.

A microdose test analyzes a biological sample, for example, blood, plasma, urine, feces, or bile containing an ultratrace amount of $^{14}C$ labeled compound. Thus, the biological sample should preferably be pretreated to facilitate the analysis. Since the ratio $^{14}C/^{Total}C$ of $^{14}C$ to total carbon in the biological sample is one of the parameters determining the detection sensitivity in the measurement due to characteristics of the CRDS unit, it is preferred to remove the carbon source derived from the biological objects contained in the biological sample.

Examples of deproteinization include insolubilization of protein with acid or organic solvent; ultrafiltration and dialysis based on a difference in molecular size; and solid-phase extraction. As described below, deproteinzation with organic solvent is preferred, which can extract the $^{14}C$ labeled compound and in which the organic solvent can be readily removed after treatment.

The deproteinization with organic solvent involves addition of the organic solvent to a biological sample to insolubilize protein. The $^{14}C$ labeled compound adsorbed on the protein is extracted to the organic solvent in this process. To enhance the recovery rate of the $^{14}C$ labeled compound, the solution is transferred to another vessel and fresh organic solvent is added to the residue to further extract the labeled compound. The extraction operations may be repeated several times. In the case that the biological sample is feces or an organ such as lung, which cannot be homogeneously dispersed in organic solvent, the biological sample should preferably be homogenized. The insolubilized protein may be removed by centrifugal filtration or filter filtration, if necessary.

The organic solvent is then removed by evaporation to yield a dry $^{14}C$ labeled compound. The carbon source derived from the organic solvent can thereby be removed. Preferred examples of the organic solvent include methanol (MeOH), ethanol (EtOH), and acetonitrile (ACN). Particularly preferred is acetonitrile.

(C) The pretreated biological sample was combusted to generate gas containing carbon dioxide isotope $^{14}CO_2$ from the radioactive isotope $^{14}C$ source. $N_2O$ and CO are then removed from the resulting gas. Specifically, $^{14}CO_2$ is preferably separated by use of the device in FIGS. 2 and 3.

(D) Moisture is preferably removed from the resultant $^{14}CO_2$. For example, moisture is preferably removed from the $^{14}CO_2$ gas in the carbon dioxide isotope generator 40 by allowing the $^{14}CO_2$ gas to pass through a desiccant (e.g., calcium carbonate) or cooling the $^{14}CO_2$ gas for moisture condensation. Formation of ice or frost on the optical resonator 11, which is caused by moisture contained in the $^{14}CO_2$ gas, may lead to a reduction in reflectance of the mirrors, resulting in low detection sensitivity. Thus, removal of moisture improves analytical accuracy. The $^{14}CO_2$ gas is preferably cooled and then introduced into the spectrometer 10 for the subsequent spectroscopic process. Introduction of the $^{14}CO_2$ gas at room temperature significantly varies the temperature of the optical resonator, resulting in a reduction in analytical accuracy.

(E) The $^{14}CO_2$ gas is fed into the optical resonator 11 having the pair of mirrors 12a and 12b. The $^{14}CO_2$ gas is preferably cooled to 273K (0° C.) or less to enhance the absorption intensity of excitation light. The optical resonator 11 is preferably maintained under vacuum because a reduced effect of the external temperature on the optical resonator improves analytical accuracy.

(F) First light obtained from the light source 23 is transmitted through the first optical fiber 21. The first light is transmitted through the second optical fiber 22 that splits from the first optical fiber 21 and couples with the first optical fiber 21 at a coupling node downstream, thereby allowing second light of longer wavelength than the first light to be generated from the second optical fiber 22. The intensities of the resulting first light and second light are amplified by amplifiers 21 and 26 different in band, respectively. The first optical fiber 21 of a shorter wavelength generates light of a wavelength range of 1.3 μm to 1.7 μm, and the second optical fiber 22 of a longer wavelength generates light of a wavelength range of 1.8 μm to 2.4 μm. The second light then couples with the first optical fiber 21 downstream, the first light and the second light are allowed to propagate through the nonlinear optical crystal 24, and a mid-infrared optical frequency comb of a wavelength range from 4.5 μm to 4.8 μm, as light of a 4.5-μm wavelength range corresponding to the absorption wavelength of carbon dioxide isotope $^{14}CO_2$, is generated as irradiation light, based on the difference in frequency. A long-axis crystal having a length in the longitudinal direction of longer than 11 mm can be used as the nonlinear optical crystal 24, thereby generating high-intensity light.

(G) The carbon dioxide isotope $^{14}CO_2$ is in resonance with the light. To improve analytical accuracy, the external vibration of the optical resonator 11 is preferably reduced by a vibration absorber to prevent a perturbation in distance between the mirrors 12a and 12b. During resonance, the downstream end of the first optical fiber 21 should preferably abut on the mirror 12a to prevent the light from coming into contact with air. The intensity of light transmitted from the optical resonator 11 is then determined. As illustrated in FIG. 5, the light may be split and the intensity of each light obtained by such splitting may be measured.

(H) The concentration of carbon isotope $^{14}C$ is calculated from the intensity of the transmitted light.

Although the carbon isotope analysis method according to the first aspect has been described above, the configuration of the carbon isotope analysis method should not be limited to the embodiment described above, and various modifications may be made. Other aspects of the carbon isotope analysis method will now be described by focusing on modified points from the first aspect.

[Second Aspect of Carbon Isotope Analysis Method]

The second aspect of the carbon isotope analysis method includes the following steps with which step (F) above is replaced.

(A) The carbon isotope analysis method includes generating an optical comb made of a flux of narrow-line-width light beams where the frequency region of a light beam is 4500 nm to 4800 nm.
(B) As illustrated in FIG. 17A, a spectrum of a light beam in the optical comb is then displayed at the center of the absorption wavelength region of a test subject, in a light spectrum diagram of intensity-versus-frequency.
(C) The light from the optical comb is transmitted through the optical fiber for beat signal measurement.
(D) The light from the light source is applied to a test subject, and the amount of light absorption is measured by an optical resonator (CRDS).
(E) The light from the light source is partially split and transmitted to the optical fiber for beat signal measurement, and a beat signal is generated based on the difference in frequency between the light from the light source and the light from the optical comb source. Such a beat signal may also be generated with scanning in a wide range of frequency as in (1), (2) . . . indicated by arrows in FIG. 17B. Such a beat signal may also be generated in a desired frequency region as illustrated in FIG. 17C.
(F) Not only the amount of light absorption, obtained in step (D), but also the wavelength of light applied to the test subject, obtained by the beat signal obtained in step (E), is recorded. An accurate amount of light absorption of the test subject is measured based on such recording.

The present invention enables accurate measurement to be realized in a simple and convenient measurement system, although no phase-locking is daringly performed by an optical comb.

[Third Aspect of Carbon Isotope Analysis Method]

<Method of Cancelling Interference Due to Parasitic Etalon Effect>

A third aspect of a carbon isotope analysis method is provided where a step of cancelling interference due to the parasitic etalon effect is further added in the first and second aspects of the carbon isotope analysis method.

Specifically, a carbon isotope analysis device including the spectrometer 10D illustrated in FIG. 20 is prepared. The transmission windows 61 and 63 disposed on respective optical axes between the optical resonator 11 and the light generator 20 and between the optical resonator 11 and the photodetector are adjusted so as to be at a Brewster's angle against the optical axes. The driving means H is operated to swing a transmission window made of $CaF_2$ at 1 to 100 Hz, preferably 35 Hz, and at a width of 0.05 to 5 degrees, preferably 1 degree, on the optical axes. As described above, such a noise on a baseline, due to parasitic etalon, can be decreased as illustrated in FIG. 18B.

Alternatively, such a noise on a baseline, due to parasitic etalon, can be decreased by preparing the carbon isotope analysis device including the cooler (Peltier device) in the vacuum device, as illustrated in FIG. 6, and changing the temperature of the optical resonator in a range from 0.1 to 20° C., preferably in a range 1 to 5° C. In such a case, the temperature is preferably controlled so that distinction between $^{14}CO_2$ absorption lines and $^{13}CO_2$ and $^{12}CO_2$ absorption lines, and a decrease in noise on a baseline, due to parasitic etalon, can be simultaneously satisfied. The temperature is preferably changed in a range from 1 to 5° C. with the optical resonator being cooled to −10 to −40° C., and the temperature is more preferably changed in a range from 0.5 to 1° C. with the optical resonator being cooled to −20 to −40° C.

(Other Embodiments)

Although the embodiment of the present invention has been described above, the descriptions and drawings as part of this disclosure should not be construed to limit the present invention. This disclosure will enable those skilled in the art to find various alternative embodiments, examples, and operational techniques.

The carbon isotope analysis device according to the embodiment has been described by focusing on the case where the analyte as a carbon isotope is radioisotope $^{14}C$. The carbon isotope analysis device can analyze stable isotopes $^{12}C$ and $^{13}C$ besides radioisotope $^{14}C$. In such a case, excitation light of 2 μm or 1.6 μm is preferably used in, for example, absorption line analysis of $^{12}CO_2$ or $^{13}CO_2$ based on analysis of $^{12}C$ or $^{13}C$.

In the case of absorption line analysis of $^{12}CO_2$ or $^{13}CO_2$, the distance between the mirrors is preferably 10 to 60 cm, and the curvature radius of the mirrors is preferably equal to or longer than the distance therebetween.

Although the carbon isotopes $^{12}C$, $^{13}C$, and $^{14}C$ exhibit the same chemical behaviors, the natural abundance of $^{14}C$ (radioisotope) is lower than that of $^{12}C$ or $^{13}C$ (stable isotope). Artificial enrichment of the radioisotope $^{14}C$ and accurate analysis of the isotope can be applied to observation of a variety of reaction mechanisms.

The carbon isotope analysis device according to the embodiment may further include a third optical fiber configured from a nonlinear fiber that splits from a first optical fiber and couples with the first optical fiber, downstream of a splitting node. Such first to third optical fibers can be combined to thereby generate two or more various light beams different in frequency.

A medical diagnostic device or environmental measuring device including the configuration described above in the embodiment can be produced as in the carbon isotope analysis device. The light generator described in the embodiments can also be used as a measuring device.

An optical frequency comb corresponds to a light source where longitudinal modes of a laser spectrum are arranged at equal frequency intervals at a very high accuracy, and is expected to serve as a novel, highly functional light source in the fields of precision spectroscopy and high-accuracy distance measurement. Since many absorption spectrum bands of substances are present in the mid-infrared region, it is important to develop a mid-infrared optical frequency comb light source. The above light generator can be utilized in various applications.

As described above, the present invention certainly includes, for example, various embodiments not described herein. Thus, the technological range of the present invention is defined by only claimed elements of the present invention in accordance with the proper claims through the above descriptions.

REFERENCE SIGNS LIST 1 carbon isotope analysis device
10 spectrometer
11 optical resonator 12 mirror
13 piezoelectric element
14 diffraction grating
15 photodetector
16 cell
18 vacuum device
19 Peltier element
20A, 20B light generator
21 first optical fiber
22 second optical fiber
23 light source
24 nonlinear optical crystal
25 first amplifier
26 second amplifier
28 delay line
29 optical switch
30 arithmetic device
40 carbon dioxide isotope generator
50 light generator
50A light generator body
51 main light source
54 optical fiber
58 splitter
50B beat signal measurement system
52 optical comb source
53 photodetector
55, 56 optical fiber
59 splitter

The invention claimed is:

1. A carbon isotope analysis device comprising:
a carbon dioxide isotope generator provided with a combustion unit that generates gas containing carbon dioxide isotope from carbon isotope, and a carbon dioxide isotope purifying unit;
a spectrometer comprising an optical resonator having a pair of mirrors, and a photodetector that determines intensity of light transmitted from the optical resonator; and
a light generator comprising a single light source, a first optical fiber that transmits first light from the light source, a second optical fiber that generates second light of a longer wavelength than the first light, the second optical fiber splitting from a splitting node of the first optical fiber and coupling with the first optical fiber at a coupling node downstream, a first amplifier that is disposed between the splitting node and the coupling node of the first optical fiber, a second amplifier that is disposed between the splitting node and the coupling node of the second optical fiber and that is different in band from the first amplifier, and a nonlinear optical crystal that allows a plurality of light beams different in frequency to propagate through to thereby generate a mid-infrared optical frequency comb of a wavelength range from 4.5 μm to 4.8 μm, from the difference in frequency, as light at an absorption wavelength of the carbon dioxide isotope,
wherein the first optical fiber further comprises a third amplifier between the first amplifier and the coupling node, and
the second optical fiber further comprises a second wavelength-shifting fiber between the splitting node and the second amplifier.

2. The carbon isotope analysis device according to claim 1, wherein the light source is a 1.55-μm ultrashort pulsed-laser light source, the first amplifier is an Er-doped optical fiber amplifier and the second amplifier is a Tm-doped optical fiber amplifier, in the light generator.

3. The carbon isotope analysis device according to claim 2, wherein
the first optical fiber further comprises a first wavelength-shifting fiber between the third amplifier and the coupling node.

4. The carbon isotope analysis device according to claim 3, wherein the first wavelength-shifting fiber is a dispersion shifted fiber (DSF).

5. The carbon isotope analysis device according to claim 2, wherein
the second optical fiber further comprises a third wavelength-shifting fiber between the second amplifier and the coupling node.

6. The carbon isotope analysis device according to claim 5, wherein light of a wavelength range of 1.8 μm to 2.0 μm is emitted through the second wavelength-shifting fiber, and
light of a wavelength range of 2.3 μm to 2.4 μm is emitted through the third wavelength-shifting fiber.

7. The carbon isotope analysis device according to claim 5, wherein the second wavelength-shifting fiber is a small core fiber, and
the third wavelength-shifting fiber is a highly nonlinear dispersion shifted fiber (HN-DSF).

8. The carbon isotope analysis device according to claim 1, wherein the light generator applies light of a wavelength range of 1.3 μm to 1.7 μm through the first optical fiber and applies light of a wavelength range of 1.8 μm to 2.4 μm through the second optical fiber.

9. The carbon isotope analysis device according to claim 1, wherein a distance in a flow direction of light, of the nonlinear optical crystal, is longer than 11 mm.

10. The carbon isotope analysis device according to claim 1, wherein the light generator further comprises a delay line comprising a wavelength filter that separates the light from the light source to a plurality of spectral components, and a wavelength filter that adjusts the relative time delays of the plurality of spectral components and focuses the spectral components on the nonlinear crystal.

11. The carbon isotope analysis device according to claim 1, wherein the nonlinear optical crystal is a PPMgSLT crystal or a PPLN crystal, or a GaSe crystal.

12. The carbon isotope analysis device according to claim 1, wherein the spectrometer further comprises a cooler that cools the optical resonator.

13. The carbon isotope analysis device according to claim 1, wherein the spectrometer further comprises a vacuum device that accommodates the optical resonator.

14. A carbon isotope analysis method, comprising:
providing a light generator that includes a single light source, a first optical fiber that transmits first light from the light source, a second optical fiber that generates second light of a longer wavelength than the first light, the second optical fiber splitting from a splitting node of the first optical fiber and coupling with the first optical fiber at a coupling node downstream, a first amplifier that is disposed between the splitting node and the coupling node of the first optical fiber, a second amplifier that is disposed between the splitting node and the coupling node of the second optical fiber and that is different in band from the first amplifier, and a nonlinear optical crystal;
generating carbon dioxide isotope from carbon isotope;
feeding the carbon dioxide isotope into an optical resonator having a pair of mirrors;
generating a plurality of light beams different in frequency, from the single light source, and amplifying intensities of the plurality of light beams obtained, by use of the first amplifier and the second amplifier;

allowing the plurality of light beams to propagate through the nonlinear optical crystal to thereby generate a mid-infrared optical frequency comb of a wavelength range from 4.5 µm to 4.8 µm, as irradiation light at an absorption wavelength of the carbon dioxide isotope, due to the difference in frequency;

measuring the intensity of the transmitted light generated by resonance of carbon dioxide isotope excited by the irradiation light; and calculating the concentration of the carbon isotope from the intensity of the transmitted light, wherein the first optical fiber further comprises a third amplifier between the first amplifier and the coupling node, and wherein the second optical fiber further comprises a wavelength-shifting fiber between the splitting node and the second amplifier.

15. The carbon isotope analysis method according to claim 14, wherein a light beam of a shorter wavelength is light of a wavelength range of 1.3 µm to 1.7 µm and a light beam of a longer wavelength is light of a wavelength range of 1.8 µm to 2.4 µm, among the light beams amplified.

16. The carbon isotope analysis method according to claim 14, wherein the irradiation light is applied to radioactive carbon dioxide isotope $^{14}CO_2$.

17. A light generator comprising:
a single light source;
a first optical fiber that transmits light from the light source;
a second optical fiber that transmits light of a longer wavelength than the first optical fiber, the second optical fiber splitting from a splitting node of the first optical fiber and coupling with the first optical fiber at a coupling node downstream;
a first amplifier that is disposed between the splitting node and the coupling node of the first optical fiber;
a second amplifier that is disposed between the splitting node and the coupling node of the second optical fiber and that is different in band from the first amplifier;
a third amplifier between the first amplifier and the coupling node;
a wavelength-shifting fiber between the splitting node and the second amplifier; and
a nonlinear optical crystal through which a plurality of light beams different in frequency are allowed to propagate through to thereby generate a mid-infrared optical frequency comb of a wavelength range from 4.5 µm to 4.8 µm, as light at an absorption wavelength of the carbon dioxide isotope, due to the difference in frequency.

18. The carbon isotope analysis device according to claim 17, wherein the light source is a 1.55-µm ultrashort pulsed-laser light source, the first amplifier is an Er-doped optical fiber amplifier and the second amplifier is a Tm-doped optical fiber amplifier, in the light generator.

19. The carbon isotope analysis device according to claim 17, wherein the light generator applies light of a wavelength range of 1.3 µm to 1.7 µm through the first optical fiber and applies light of a wavelength range of 1.8 µm to 2.4 µm through the second optical fiber.

20. The light generator according to claim 17, as an ultrashort pulsed-laser light source that generates a mid-infrared optical frequency comb of a wavelength range from 4.5 to 4.8 µm.

* * * * *